(12) United States Patent
Takeda et al.

(10) Patent No.: US 11,991,598 B2
(45) Date of Patent: May 21, 2024

(54) MULTICAST TRANSMISSION FEEDBACK AND BUFFER PROCESSING

(71) Applicant: QUALCOMM Incorporated, San Diego, CA (US)

(72) Inventors: Kazuki Takeda, Tokyo (JP); Alberto Rico Alvarino, San Diego, CA (US); Le Liu, Fremont, CA (US); Peter Gaal, San Diego, CA (US); Wanshi Chen, San Diego, CA (US); Ayan Sengupta, San Diego, CA (US); Prasad Reddy Kadiri, San Diego, CA (US); Tao Luo, San Diego, CA (US); Mostafa Khoshnevisan, San Diego, CA (US); Juan Montojo, San Diego, CA (US); Umesh Phuyal, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 17/244,055

(22) Filed: Apr. 29, 2021

(65) Prior Publication Data

US 2021/0345071 A1 Nov. 4, 2021

Related U.S. Application Data

(60) Provisional application No. 63/017,794, filed on Apr. 30, 2020.

(51) Int. Cl.
*H04W 4/06* (2009.01)
*H04L 1/1812* (2023.01)
(Continued)

(52) U.S. Cl.
CPC .............. *H04W 4/06* (2013.01); *H04L 1/1819* (2013.01); *H04L 1/1896* (2013.01); *H04W 76/11* (2018.02)

(58) Field of Classification Search
CPC ....... H04W 4/06; H04W 76/11; H04L 1/1819; H04L 1/1896; H04L 2001/0093; H04L 1/1835; H04L 1/1854; H04L 1/1822
See application file for complete search history.

(56) References Cited

U.S. PATENT DOCUMENTS 11,581,922 B2 *   2/2023   Fakoorian ................ H04L 1/08
2010/0296427 A1  11/2010   Lohr et al.
(Continued)

FOREIGN PATENT DOCUMENTS

EP           3051727 A1    8/2016
WO     WO-2018056108 A1    3/2018

OTHER PUBLICATIONS

Partial International Search Report—PCT/US2021/030129—ISA/EPO—dated Aug. 12, 2021.
(Continued)

*Primary Examiner* — Abdullahi Ahmed
(74) *Attorney, Agent, or Firm* — Holland & Hart LLP/Qualcomm Incorporated

(57) ABSTRACT

Methods, systems, and devices for wireless communications are described. A user equipment (UE) and a base station may communicate in a wireless communications system. The UE may receive first control signaling indicating a first radio network temporary identifier (RNTI) and a first feedback process identifier, where the first RNTI indicates scheduling of a unicast downlink transmission. The UE may also receive second control signaling indicating a second RNTI and a second feedback process identifier, where the second RNTI indicates scheduling of a multicast downlink transmission. The UE may manage a hybrid automatic repeat
(Continued)

request (HARM) process at the UE associated with the unicast downlink transmission and the multicast downlink transmission based on the first RNTI, the first feedback process identifier, the second RNTI, and the second feedback process identifier. The UE may also simultaneously process multicast downlink transmission and broadcast signaling.

42 Claims, 13 Drawing Sheets

(51) Int. Cl.
*H04L 1/1867* (2023.01)
*H04W 76/11* (2018.01)

(56) References Cited

U.S. PATENT DOCUMENTS

| | | | |
|---|---|---|---|
| 2012/0281647 A1* | 11/2012 | Kuo | H04L 1/1812 |
| | | | 370/328 |
| 2020/0008097 A1* | 1/2020 | Fujishiro | H04W 72/30 |
| 2020/0204329 A1* | 6/2020 | Fujishiro | H04L 1/1861 |
| 2021/0289540 A1* | 9/2021 | Khoshnevisan | H04L 1/189 |
| 2022/0312377 A1* | 9/2022 | Takeda | H04W 72/23 |
| 2022/0322046 A1* | 10/2022 | Takeda | H04W 4/06 |

OTHER PUBLICATIONS

International Search Report and Written Opinion—PCT/US2021/030129—ISA/EPO—dated Nov. 24, 2021.

* cited by examiner

MULTICAST TRANSMISSION FEEDBACK AND BUFFER PROCESSING

CROSS REFERENCE

The present application for patent claims the benefit of U.S. Provisional Patent Application No. 63/017,794 by TAKEDA et al., entitled "MULTICAST TRANSMISSION FEEDBACK AND BUFFER PROCESSING," filed Apr. 30, 2020, assigned to the assignee hereof, and expressly incorporated by reference in its entirety herein.

FIELD OF TECHNOLOGY

The following relates generally to wireless communications and more specifically to multicast transmission feedback and buffer processing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may receive different types of transmissions from a base station such as unicast transmissions, multicast transmissions, or broadcast transmissions.

SUMMARY

The described techniques relate to improved methods, systems, devices, and apparatuses that support multicast transmission feedback and buffer processing, including a hybrid automatic repeat request (HARQ) process. Generally, the described techniques provide for managing data storage in a buffer for unicast, multicast, and broadcast transmissions. A user equipment (UE) and a base station may communicate in a wireless communications system. The UE may receive first control signaling indicating a first radio network temporary identifier (RNTI) and a first feedback process identifier, where the first RNTI indicates scheduling of a unicast downlink transmission. The UE may also receive second control signaling indicating a second RNTI and a second feedback process identifier, where the second RNTI indicates scheduling of a multicast downlink transmission. The UE may manage a feedback and buffer process (e.g., a HARQ process) at the UE associated with the unicast downlink transmission and the multicast downlink transmission based on the first RNTI, the first feedback process identifier, the second RNTI, and the second feedback process identifier.

The UE may also receive broadcast signaling having a periodicity satisfying (e.g., above) a first threshold, a transport block (TB) size satisfying (e.g., below) a second threshold, or both. The UE may receive a multicast downlink transmission that is configured without feedback processing. The UE may then process the multicast downlink transmission and the broadcast signaling during a same time period based on a remainder of a baseband processing budget for broadcast signaling processing.

A method of wireless communications at a UE is described. The method may include receiving first control signaling indicating a first RNTI and a first feedback process identifier, where the first RNTI indicates scheduling of a unicast downlink transmission, receiving second control signaling indicating a second RNTI and a second feedback process identifier, where the second RNTI indicates scheduling of a multicast downlink transmission, and managing a hybrid automatic repeat request (HARQ) process at the UE associated with the unicast downlink transmission and the multicast downlink transmission based on the first RNTI, the first feedback process identifier, the second RNTI, and the second feedback process identifier.

An apparatus for wireless communications at a UE is described. The apparatus may include a processor, memory coupled with the processor, and instructions stored in the memory. The instructions may be executable by the processor to cause the apparatus to receive first control signaling indicating a first RNTI and a first feedback process identifier, where the first RNTI indicates scheduling of a unicast downlink transmission, receive second control signaling indicating a second RNTI and a second feedback process identifier, where the second RNTI indicates scheduling of a multicast downlink transmission, and manage a HARQ process at the UE associated with the unicast downlink transmission and the multicast downlink transmission based on the first RNTI, the first feedback process identifier, the second RNTI, and the second feedback process identifier.

Another apparatus for wireless communications at a UE is described. The apparatus may include means for receiving first control signaling indicating a first RNTI and a first feedback process identifier, where the first RNTI indicates scheduling of a unicast downlink transmission, receiving second control signaling indicating a second RNTI and a second feedback process identifier, where the second RNTI indicates scheduling of a multicast downlink transmission, and managing a HARQ process at the UE associated with the unicast downlink transmission and the multicast downlink transmission based on the first RNTI, the first feedback process identifier, the second RNTI, and the second feedback process identifier.

A non-transitory computer-readable medium storing code for wireless communications at a UE is described. The code may include instructions executable by a processor to receive first control signaling indicating a first RNTI and a first feedback process identifier, where the first RNTI indicates scheduling of a unicast downlink transmission, receive second control signaling indicating a second RNTI and a second feedback process identifier, where the second RNTI indicates scheduling of a multicast downlink transmission, and manage a HARQ process at the UE associated with the unicast downlink transmission and the multicast downlink transmission based on the first RNTI, the first feedback process identifier, the second RNTI, and the second feedback process identifier.

Some examples of the method, apparatuses, and non-transitory computer-readable medium described herein may further include operations, features, means, or instructions for identifying an assignment of the second feedback process identifier to the multicast downlink transmission based on receiving the second control signaling.

Some examples of the method, apparatuses, and non-transitory computer-readable medium described herein may further include operations, features, means, or instructions for storing data associated with the multicast downlink transmission in a buffer, and labeling the stored data associated with the multicast downlink transmission with the second feedback process identifier.

Some examples of the method, apparatuses, and non-transitory computer-readable medium described herein may further include operations, features, means, or instructions for determining to refrain from storing data associated with the multicast downlink transmission in a buffer based on the second feedback process identifier.

Some examples of the method, apparatuses, and non-transitory computer-readable medium described herein may further include operations, features, means, or instructions for receiving control signaling indicating a buffer storage configuration for storing data associated with the multicast downlink transmission in a buffer.

Some examples of the method, apparatuses, and non-transitory computer-readable medium described herein may further include operations, features, means, or instructions for determining that the first feedback process identifier and the second feedback process identifier correspond to a same feedback process identifier value and that the first RNTI may be different from the second RNTI, and flushing stored data from a buffer based on determining that the first feedback process identifier and the second feedback process identifier correspond to the same identifier value and that the first RNTI may be different from the second RNTI.

Some examples of the method, apparatuses, and non-transitory computer-readable medium described herein may further include operations, features, means, or instructions for applying one or more feedback process processing rules to the unicast downlink transmission and the multicast downlink transmission according to a single HARQ process for the unicast downlink transmission and the multicast downlink transmission.

Some examples of the method, apparatuses, and non-transitory computer-readable medium described herein may further include operations, features, means, or instructions for identifying a first data rate for the multicast downlink transmission and a second data rate for the unicast downlink transmission, where the first data rate and the second data rate may be dynamically configured based on a component carrier (CC) data rate.

Some examples of the method, apparatuses, and non-transitory computer-readable medium described herein may further include operations, features, means, or instructions for receiving configuration signaling indicating a semi-static assignment of a first set of feedback process identifiers for unicast downlink transmissions and a second set of feedback process identifiers for multicast downlink transmissions.

Some examples of the method, apparatuses, and non-transitory computer-readable medium described herein may further include operations, features, means, or instructions for managing a first HARQ process for the unicast downlink transmission, and managing a second HARQ process for the multicast downlink transmission, where the second HARQ process may be managed in parallel with the first HARQ process.

Some examples of the method, apparatuses, and non-transitory computer-readable medium described herein may further include operations, features, means, or instructions for applying one or more feedback process processing rules to both the unicast downlink transmission and the multicast downlink transmission across the first HARQ process and the second HARQ process.

Some examples of the method, apparatuses, and non-transitory computer-readable medium described herein may further include operations, features, means, or instructions for identifying a non-sequential ordering between a downlink data transmission and a corresponding feedback process identifier across the first HARQ process and the second HARQ process or a non-sequential ordering between a control channel transmission and a corresponding data transmission across the first HARQ process and the second HARQ process.

Some examples of the method, apparatuses, and non-transitory computer-readable medium described herein may further include operations, features, means, or instructions for receiving configuration signaling that configures a first set of physical downlink control channel candidates for the first control signaling indicating the first RNTI and configures a second set of physical downlink control channel candidates for the second control signaling indicating the second RNTI.

Some examples of the method, apparatuses, and non-transitory computer-readable medium described herein may further include operations, features, means, or instructions for receiving configuration signaling that indicates a first feedback processing timeline for the unicast downlink transmission and a second feedback processing timeline for the multicast downlink transmission, where the first feedback processing timeline may be different from the second feedback processing timeline.

Some examples of the method, apparatuses, and non-transitory computer-readable medium described herein may further include operations, features, means, or instructions for identifying a first data rate for the multicast downlink transmission and a second data rate for the unicast downlink transmission, where the first data rate and the second data rate may be semi-statically configured based on a component carrier (CC) data rate.

Some examples of the method, apparatuses, and non-transitory computer-readable medium described herein may further include operations, features, means, or instructions for determining that the first feedback process identifier and the second feedback process identifier correspond to a same feedback process identifier value and that the first RNTI may be different from the second RNTI, storing data associated with the unicast downlink transmission in a first buffer according to the first HARQ process, and storing data associated with the multicast downlink transmission in a second buffer according to the second HARQ process.

Some examples of the method, apparatuses, and non-transitory computer-readable medium described herein may further include operations, features, means, or instructions for identifying the first feedback process identifier from the first set of feedback process identifiers, and identifying the second feedback process identifier from the second set of feedback process identifiers.

A method of wireless communications at a UE is described. The method may include receiving broadcast signaling having a periodicity above a first threshold, a transport block size below a second threshold, or both, receiving a multicast downlink transmission that is configured without feedback processing, and processing the multicast downlink transmission and the broadcast signaling during a same time period based on a remainder of a baseband processing budget for broadcast signaling processing.

An apparatus for wireless communications at a UE is described. The apparatus may include a processor, memory coupled with the processor, and instructions stored in the memory. The instructions may be executable by the processor to cause the apparatus to receive broadcast signaling having a periodicity above a first threshold, a transport block size below a second threshold, or both, receive a multicast downlink transmission that is configured without feedback processing, and process the multicast downlink transmission and the broadcast signaling during a same time period based on a remainder of a baseband processing budget for broadcast signaling processing.

Another apparatus for wireless communications at a UE is described. The apparatus may include means for receiving broadcast signaling having a periodicity above a first threshold, a transport block size below a second threshold, or both, receiving a multicast downlink transmission that is configured without feedback processing, and processing the multicast downlink transmission and the broadcast signaling during a same time period based on a remainder of a baseband processing budget for broadcast signaling processing.

A non-transitory computer-readable medium storing code for wireless communications at a UE is described. The code may include instructions executable by a processor to receive broadcast signaling having a periodicity above a first threshold, a transport block size below a second threshold, or both, receive a multicast downlink transmission that is configured without feedback processing, and process the multicast downlink transmission and the broadcast signaling during a same time period based on a remainder of a baseband processing budget for broadcast signaling processing.

Some examples of the method, apparatuses, and non-transitory computer-readable medium described herein may further include operations, features, means, or instructions for receiving a unicast downlink transmission, and processing the unicast downlink transmission, the multicast downlink transmission, and the broadcast signaling during the same time period based on the remainder of the baseband processing budget for broadcast signaling processing.

In some examples of the method, apparatuses, and non-transitory computer-readable medium described herein, a combined data rate for the unicast downlink transmission and the multicast downlink transmission may be less than a CC data rate.

Some examples of the method, apparatuses, and non-transitory computer-readable medium described herein may further include operations, features, means, or instructions for receiving configuration signaling indicating a processing allocation of a baseband processing budget between broadcast signaling processing, unicast signaling processing, and multicast signaling processing.

In some examples of the method, apparatuses, and non-transitory computer-readable medium described herein, the multicast downlink transmission may be received and processed while the UE may be in an idle state or an inactive state.

DETAILED DESCRIPTION

Figure 1:
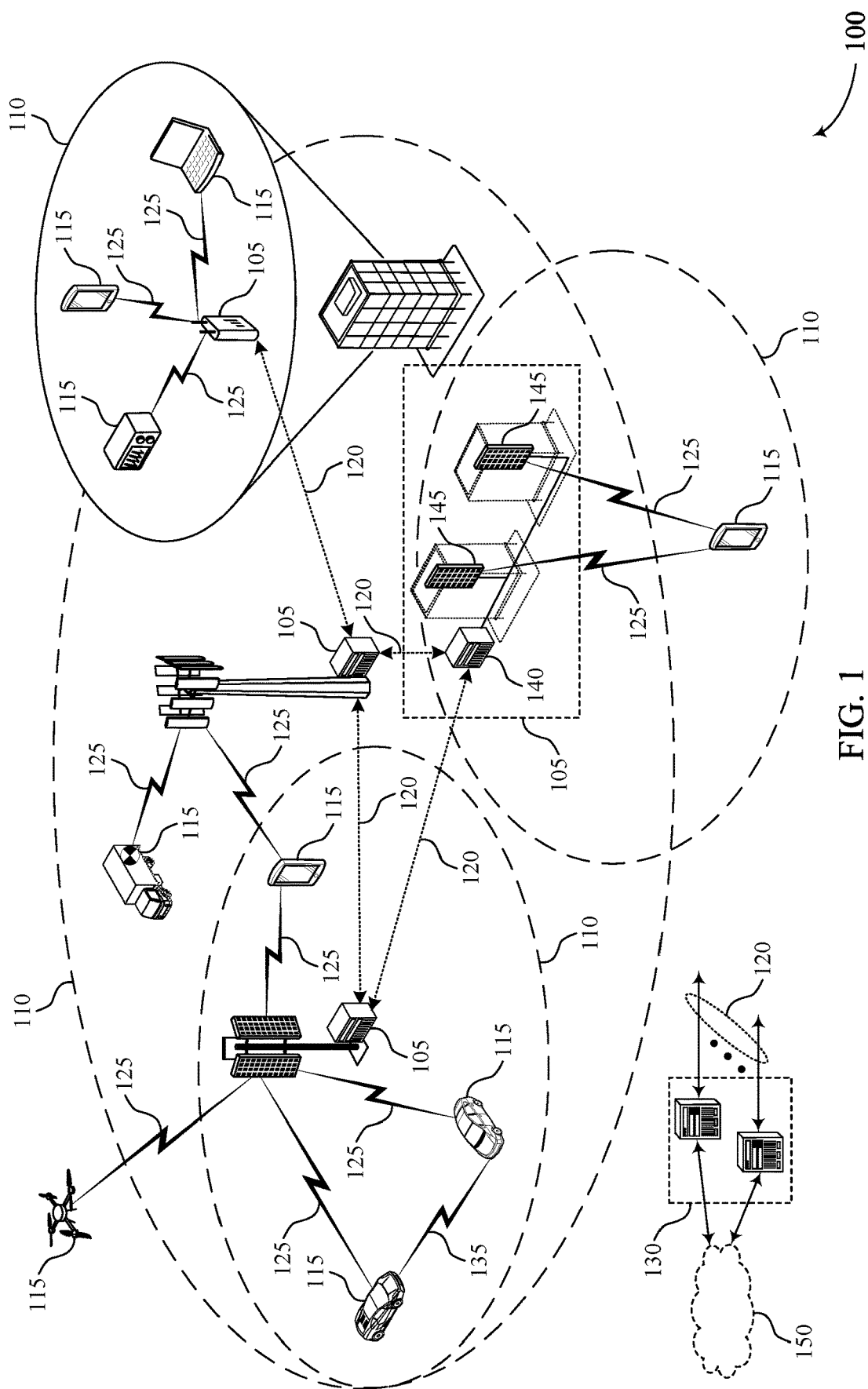
FIG. 1 illustrates an example of a wireless communications system that supports multicast transmission feedback and buffer processing in accordance with aspects of the present disclosure.

A user equipment (UE) and a base station may communicate over a communication channel in a wireless communications system. The base station may transmit unicast data to the UE, as well and multicast data and broadcast data. Unicast data may include data specifically for a particular UE. Multicast data may include a same signal transmitted to multiple UEs served by the base station. Broadcast data may include data transmitted in a channel that any UE can receive, and may include data applicable to many UEs.

A base station may transmit unicast data, multicast data, and broadcast data in a physical downlink shared channel (PDSCH). A PDSCH containing each type of data may have a cyclic redundancy check (CRC) scrambled by a different type of radio network temporary identifier (RNTI). For example, in the case of multicast data, one or more UEs may receive a PDSCH containing multicast data simultaneously. The PDSCH containing the multicast data may be scheduled by downlink control information (DCI). The DCI may correspond to a DCI format where a cyclic redundancy check (CRC) is scrambled by a multimedia broadcast multicast service RNTI (M-RNTI) or a group RNTI (G-RNTI). In another example for the case of unicast data, the PDSCH and corresponding DCI may have a CRC that is scrambled by a cell-RNTI (C-RNTI), where the C-RNTI is UE-specific, and thus corresponds to unicast data.

When a UE receives unicast data, the UE may also be configured to perform a hybrid automatic repeat request (HARM) process. The UE may receive control signaling (e.g., a DCI) scheduling a unicast data transmission. The UE may then monitor the resources on which the unicast data is transmitted, and may attempt to decode the unicast data. Based on the success of the reception and decoding of the unicast data, the UE may transmit an acknowledgment (ACK) or a negative ACK (NACK) to the base station, such that the base station may be aware of whether the UE successfully received the transmission. The base station may then determine whether to retransmit the unicast data. Further, each unicast downlink transmission may correspond to a feedback process identifier such as a HARQ process identifier (HPID). Subsequent retransmissions of a same unicast transmission may correspond to a same HPID. Different unicast transmissions may correspond to different HPIDs. The HPID for each scheduled unicast transmission may be indicated to the UE in the DCI. The UE may transmit ACK/NACKs and process downlink data in a buffer according to the specific HPID for each downlink transmission.

To improve spectral efficiency, a UE may also implement a HARQ process for multicast transmissions. The HARQ process may correspond to demodulation, decoding, soft-combining data in a buffer (e.g., in cases of retransmission) and the process of transmitting ACK/NACK feedback. A UE may be scheduled to receive unicast data in a PDSCH and multicast data in a PDSCH. The unicast data may be indicated by a C-RNTI and the multicast data may be implemented by a M-RNTI.

A UE may store unicast data in a soft buffer and manage when and how to transmit ACK/NACK feedback. The UE may store the multicast data in a same or different soft buffer as the unicast based on a number of parameters. The UE may also determine whether to flush a soft buffer to store a different type of data in the buffer (e.g., flush unicast data to store multicast data).

The UE may also be able to simultaneously receive and process unicast and broadcast PDSCH transmissions. The UE may have a set or be configured with a baseband processing budget for processing system information (e.g., broadcast transmissions). In cases where system information (or other broadcast transmissions) is configured with an extended periodicity or a reduced TB size within a given time period, the UE may process multicast transmissions with some of the baseband processing budget that is remaining after processing the system information. Thus, the UE 115 may be able to process unicast, multicast, or broadcast transmissions simultaneously.

Aspects of the disclosure are initially described in the context of wireless communications systems. Aspects of the disclosure are then described in the context of a buffer process and process flows. Aspects of the disclosure are further illustrated by and described with reference to apparatus diagrams, system diagrams, and flowcharts that relate to multicast transmission hybrid automatic repeat request (HARQ) processing.

FIG. 1 illustrates an example of a wireless communications system 100 that supports multicast transmission feedback and buffer processing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers (CCs) and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 and a base station 105 may communicate in a wireless communications system. The UE 115 may receive, from the base station 105, first control signaling indicating a first RNTI and a first feedback process identifier, where the first RNTI indicates scheduling of a unicast downlink transmission. The UE 115 may also receive, from the base station 105, second control signaling indicating a second RNTI and a second feedback process identifier, where the second RNTI indicates scheduling of a multicast downlink transmission. The UE 115 may manage a feedback and buffer process (e.g., a HARQ process) at the UE 115 associated with the unicast downlink transmission and the multicast downlink transmission based on the first RNTI, the first feedback process identifier, the second RNTI, and the second feedback process identifier.

The UE 115 may also receive, from the base station 105, broadcast signaling having a periodicity above a first threshold, a TB size below a second threshold, or both. The UE 115 may receive a multicast downlink transmission that is configured without feedback processing. The UE 115 may then process the multicast downlink transmission and the broadcast signaling during a same time period based on a remainder of a baseband processing budget for broadcast signaling processing.

Figure 2:
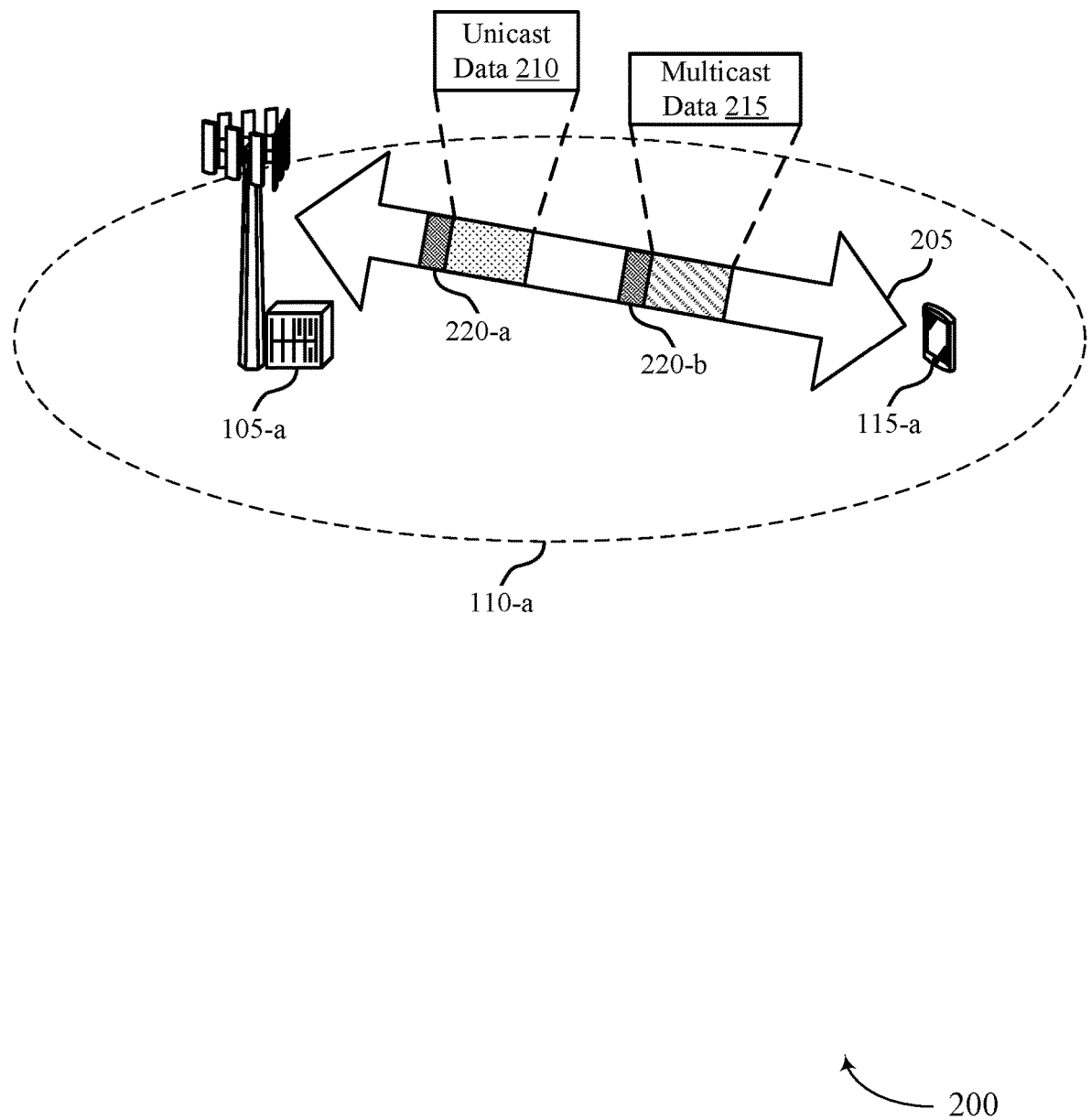
FIG. 2 illustrates an example of a wireless communications system that supports multicast transmission feedback and buffer processing in accordance with aspects of the present disclosure.

FIG. 2 illustrates an example of a wireless communications system 200 that supports multicast transmission feedback and buffer processing in accordance with aspects of the present disclosure. In some examples, wireless communications system 200 may implement aspects of wireless communication system 100. Wireless communications system 200 includes UE 115-a, which may be an example of a UE 115 as described with reference to FIG. 1. Wireless communications system 200 also includes base station 105-a, which may be an example of a base station 105 as described with reference to FIG. 1. UE 115-a and base station 105-a may communicate over a communication channel 205.

Base station 105-a may transmit control signaling 220 to UE 115-a. Control signaling 220 may schedule downlink transmissions to UE 115-a. First control signaling 220-a may schedule the transmission of unicast data 210, and second control signaling 220-b may schedule the transmission of multicast data 215. Base station 105-a may transmit unicast data 210 and multicast data 215 to UE 115-a according to control signaling 220.

UE 115-a may be configured to manage a soft buffer of unicast data and multicast data. For example, as described herein, the UE 115-a may be configured to treat multicast data 215 as a unicast data 210 transmission from a feedback process and soft buffer management perspective. Additionally or alternatively, the UE 115-a may treat the multicast data 215 as a broadcast data transmission from a feedback process and soft buffer management perspective.

First control signaling 220-a may also indicate a first RNTI and a first HPID (e.g., a feedback process identifier) corresponding to unicast data 210. The first RNTI may be a C-RNTI. The first HPID may indicate a HARQ processing schedule for transmission and retransmissions corresponding the unicast data 210. For example, UE 115-a may transmit ACK/NACK feedback for unicast data 210. Additionally or alternatively, base station 105-a may wait until the end of a time period corresponding to the HPID to transmit a retransmission of unicast data 210.

Second control signaling 220-b may indicate a second RNTI and a second HPID corresponding to multicast data 215. The second RNTI may be a M-RNTI. The second HPID may indicate a HARQ processing schedule for transmission and retransmissions corresponding the multicast data 215. For example, UE 115-a may transmit ACK/NACK feedback for multicast data 215. Additionally or alternatively, base station 105-a may wait until the end of a time period corresponding to the HPID to transmit a retransmission of multicast data 215.

In some cases, the HPID may be dynamically assigned to each of the unicast data 210 and the multicast data 215. In these cases, the control signaling 220-a scheduling the unicast data 210 may include a C-RNTI, thus indicating that the data is unicast. In these cases, UE 115-a is not aware of the type of data to be transmitted until UE 115-a decodes control signaling 220-a (e.g., a DCI).

UE 115-a may manage a HARQ process, which may include a feedback process, a buffer process or both. For example, UE 115-a may manage a buffer process, based on one or more of the C-RNTI, the HPID, the M-RNTI, and the second HPID associated with the M-RNTI. Additionally or alternatively, UE 115-a may manage a feedback process, based on one or more of the C-RNTI, the HPID, the M-RNTI, and the second HPID associated with the M-RNTI. In some cases, UE 115-a may manage the feedback process, or the buffer process, or both.

UE 115-a may receive unicast data 210 in a PDSCH, and may store the unicast data 210 in a soft buffer, in an example of a buffer process. UE 115-a may also receive multicast data 215 in a non-overlapping PDSCH. As the data in multicast data 215 is dynamically configured (e.g., UE 115-a does not know that the data is multicast until UE 115-a received control signaling 220-b), UE 115-a may also determine whether to store multicast data 215 in the same soft buffer as unicast data 210. In some cases, UE 115-a may store the multicast data 215 in the soft buffer, in which case UE 115-a may flush the unicast data 210 from the soft buffer (e.g., if the HPID for the unicast data 210 and multicast data 215 are the same). In some cases, UE 115-a may not store the multicast data 215 in the soft buffer. In other cases, UE 115-a may be configured (e.g., through configuration signaling) to either store the multicast data 215 or not store the multicast data 215.

In these cases, UE 115-a may be configured to transmit ACK/NACK feedback to base station 105-a, in an example of a feedback process. For example, UE 115-a may be configured to transmit ACK/NACK feedback in order of HPID number (e.g., UE 115-a does not transmit ACK/NACK feedback out of order). Whether UE 115-a stores multicast data 215 or does not store multicast data 215 may be based on whether the unicast HPID is the same as the multicast HPID.

In other cases, the HPID for each unicast data 210 transmission and multicast data 215 may be configured semi-statically. In this case, UE 115-a may be configured by higher layer signaling with one or multiple HPIDs for multicast transmissions. In these cases, the soft buffer management may be split between unicast data 210 and multicast data 215, according to the semi-static higher layer configuration. There may be one soft buffer for unicast data 210 and one soft buffer for multicast data 215. In these cases, UE 115-a may be capable of transmitting HARQ feedback (e.g., ACK/NACKs) for unicast data 210 and multicast data 215 out of order (e.g., out of order of HPID). For example, UE 115-a may transmit HARQ feedback for multiple unicast transmissions to base station 105-a, and then may transmit HARQ feedback for a multicast transmissions, even if the HPID of the multicast transmission is a number in the middle of the HPIDs for the unicast transmissions. In some cases, the HPID of the multicast transmission may be the same as the HPID of a unicast transmission, and the ACK/NACK feedback for each may not be transmitted simultaneously, and are thus out of order.

UE 115-a may also use different HARQ processing timeline configurations for managing the unicast buffer and the multicast buffer. For example, UE 115-a may manage the unicast buffer according to a first HARQ processing timeline configuration, and UE 115-a may manage the multicast buffer according to a second HARQ processing timeline configuration.

Further, UE 115-a may also receive multicast data 215 and broadcast data simultaneously (e.g., during a same time period). UE 115-a may have some baseband processing budget for processing system information (e.g., broadcast data). The broadcast signaling may have a periodicity satisfying (e.g., above) a first threshold, a TB size satisfying (e.g., below) a second threshold, or both. In these cases, UE 115-a may be able to process multicast data 215 and the broadcast data simultaneously. UE 115-a may thus be able to simultaneously process unicast data, multicast data, and broadcast data, even in cases where UE 115-a operates in an idle or an inactive state.

Figure 3:
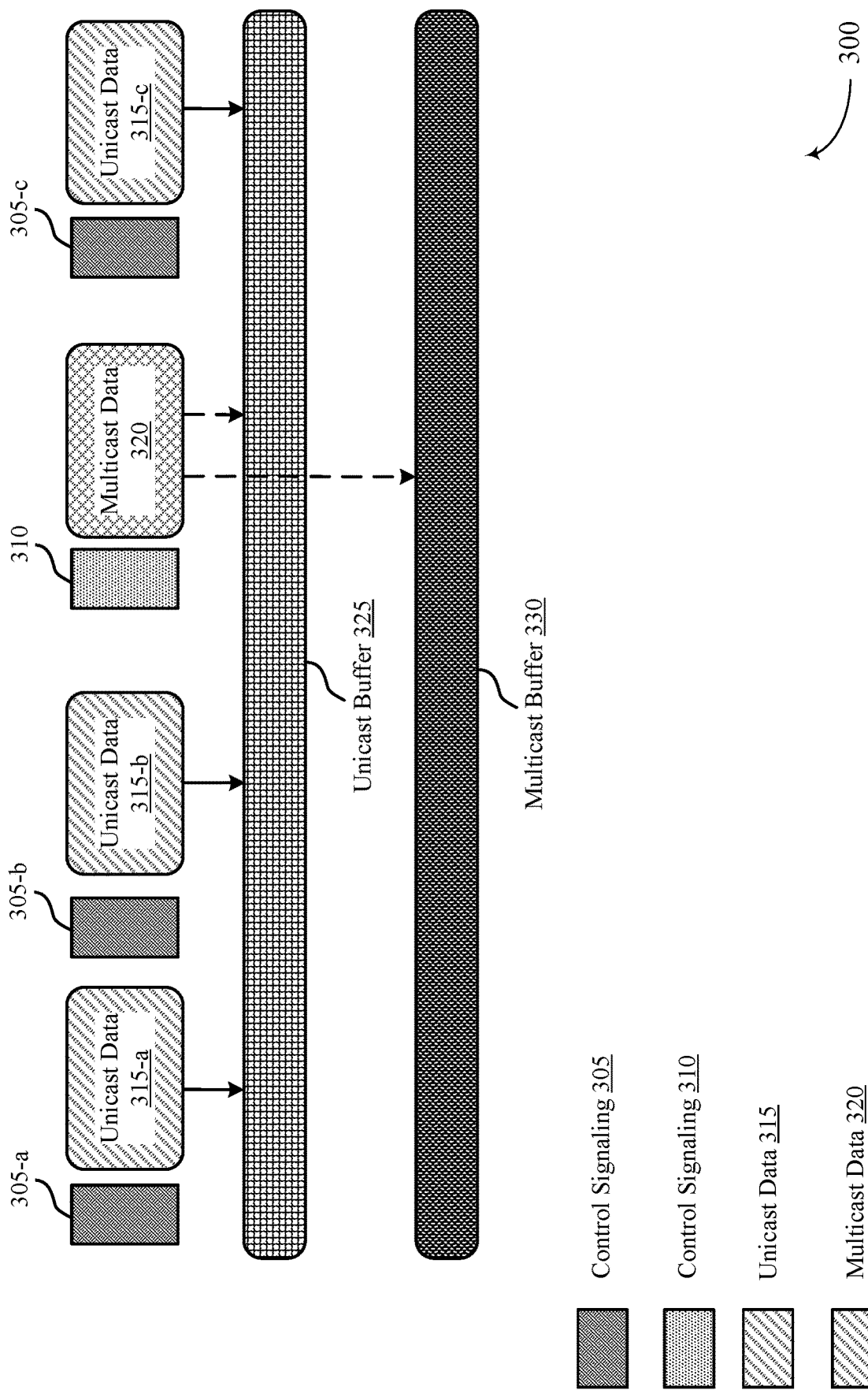
FIG. 3 illustrates an example of a buffer system that supports multicast transmission feedback and buffer processing in accordance with aspects of the present disclosure.

FIG. 3 illustrates an example of a buffer system 300 that supports multicast transmission feedback and buffer processing in accordance with aspects of the present disclosure. In some examples, buffer system 300 may implement aspects of wireless communication systems 100 and 200. A UE 115 may receive unicast transmissions and multicast transmission as described with reference to FIG. 2. The UE 115 may store unicast data and multicast data according to buffer system 300.

A UE 115 may receive control signaling from a base station 105 indicating upcoming downlink transmissions by the base station 105. The UE 115 may receive control signaling 305 indicating unicast data 315 transmissions. The UE 115 may also receive control signaling 310 indicating multicast data 320 transmissions. Control signaling 305 and 310 may schedule resources for upcoming downlink transmissions, and may also include RNTIs and HPIDs for the upcoming transmissions.

For example, the UE 115 may receive control signaling 305-a indicating unicast data 315-a. Control signaling 305-a may include a C-RNTI (indicating that the data is unicast) and a HPID number for the unicast data 315-a. The UE 115 may then receive unicast data 315-a, and may store the unicast data 315-a in unicast buffer 325. The UE 115 may use unicast buffer 325 to manage HARQ feedback in order. For example, the UE 115 may also receive control signaling 305-b indicating unicast data 315-b. Control signaling 305-b may also include a C-RNTI (indicating unicast data) and a HPID number. The UE 115 may also store the unicast data 315-b in unicast buffer 325, and may transmit HARQ feedback in order for unicast data 315. Similarly, the UE 115 may receive third control signaling 305-c, indicating unicast data 315-c, and a C-RNTI and a HPID for unicast data 315-c. Thus, unicast data 315-c may also be stored in unicast buffer 325.

The UE 115 may also receive control signaling 310 indicating multicast data 320. Control signaling 310 may include a M-RNTI (indicating that the scheduled data is multicast), and a HPID for the multicast data 320. Control signaling 305 and 310 may be transmitted to the UE 115 by a base station 105 in DCI, which may be transmitted in a physical downlink control channel (PDCCH). Unicast data 315 and multicast data 320 may each be transmitted by a base station 105 in a PDSCH. In some cases, each unicast transmission and each multicast transmission may be transmitted in non-overlapping PDSCHs.

In some cases, HPIDs for unicast data 315 and multicast data 320 are configured dynamically. That is, a UE 115 may not be aware whether upcoming data is unicast data 315 or multicast data 320 until the UE 115 reads the control signaling 305 or 310. In these dynamic cases, a UE 115 may receive multicast data 320, and may either store the multicast data in unicast buffer 325, where the stored data is labelled by the HPID indicated in control signaling 310, or the UE may not store the data in the unicast buffer 325. In some cases, the UE 115 may receive configuration information indicating whether or not to store multicast data 320 in unicast buffer 325.

A UE 115 may have stored soft bits of unicast data 315-a with a first HPID in unicast buffer 325. The UE 115 may also have stored soft bits of unicast data 315-b corresponding to a second HPID in unicast buffer 325. Then, UE 115 may receive control signaling 310 indicating multicast data 320, and multicast data 320 may have the same HPID as the unicast data 315-b. In these cases, the UE 115 may flush the soft bits of the unicast data 315-b from unicast buffer 325, and the UE 115 may store the multicast data 320 in the unicast buffer 325. In some cases, the data corresponding to the same HPID, whether unicast data 315-b or multicast data 320, is the same data. Additionally, the UE 115 may have stored multicast data 320 corresponding to the second HPID, and may also receive control signaling 310-c indicating unicast data 315-c corresponding to the same second HPID. In these cases, the UE 115 may flush the multicast bits from the buffer and store the unicast data 315-c. The UE 115 may perform this buffer management process and flushing irrespective of whether the new data indicator (NDI) is toggled in control signaling 305 or 310. For example, The UE 115 may flush the unicast data 315-b based on receiving multicast data 320 with the same HPID, whether or not the NDI field is toggled in either control signaling 305-b or control signaling 310.

In these cases of dynamically configured HPIDs, UE 115 may refrain from transmitting HARQ feedback until the end of the HARQ feedback for PDSCHs with the same HPID. In these cases, a UE 115 may determine not to perform out of order HARQ feedback. The UE 115 may also expect that the downlink scheduling is in order, such that control signaling 305 or 310 in a PDCCH is directly followed by the corresponding PDSCH, and not a different PDSCH. Further, there may be a sum data rate for unicast data 315 and multicast data 320. The data rate ratio between the unicast data 315 and the multicast data 320 may be flexible and dynamic. At some times, more data may be used for unicast data 315, and at other times more data may be used for multicast data 320. The sum data rate may be set for a given frequency resource such as a component carrier (CC) and may not exceed the data rate per CC.

In other cases, the HPID number may be semi-statically configured. In these cases, higher layer signaling may indicate to a UE 115 multiple HPIDs allocated for multicast transmissions. In these cases, a UE 115 may receive control signaling 310. The UE 115 may determine that the HPID indicating the multicast data 320 is of a set of multicast HPIDs. Then UE 115 may store multicast data 320 in multicast buffer 330, rather than flushing buffer 325 or determining not to store multicast data 320 in unicast buffer 325.

In some of these semi-statically configured cases, out of order HARQ feedback may be used. For example, unicast data 315-b and multicast data 320 may correspond to the same HPID. The UE 115 may differentiate between data with the same HPID using the different RNTI for each data transmission, as indicated in the control signaling for the transmission. The UE 115 may expect to receive unicast data 315-b and multicast data 320 out of order (e.g., not at overlapping times). For out of order performance, PDCCH carrying control signaling 305 and 310 may be selected from different sets of PDCCH candidates. For example, certain PDCCH candidates sets may corresponding to unicast control signaling 305, and other PDCCH candidate sets may correspond to multicast control signaling 310. Further, each different PDCCH candidate set may correspond to different search space set configurations. There may also be different HARQ processing timeline configuration between unicast buffer 325 management and multicast buffer 330 management.

Figure 4:
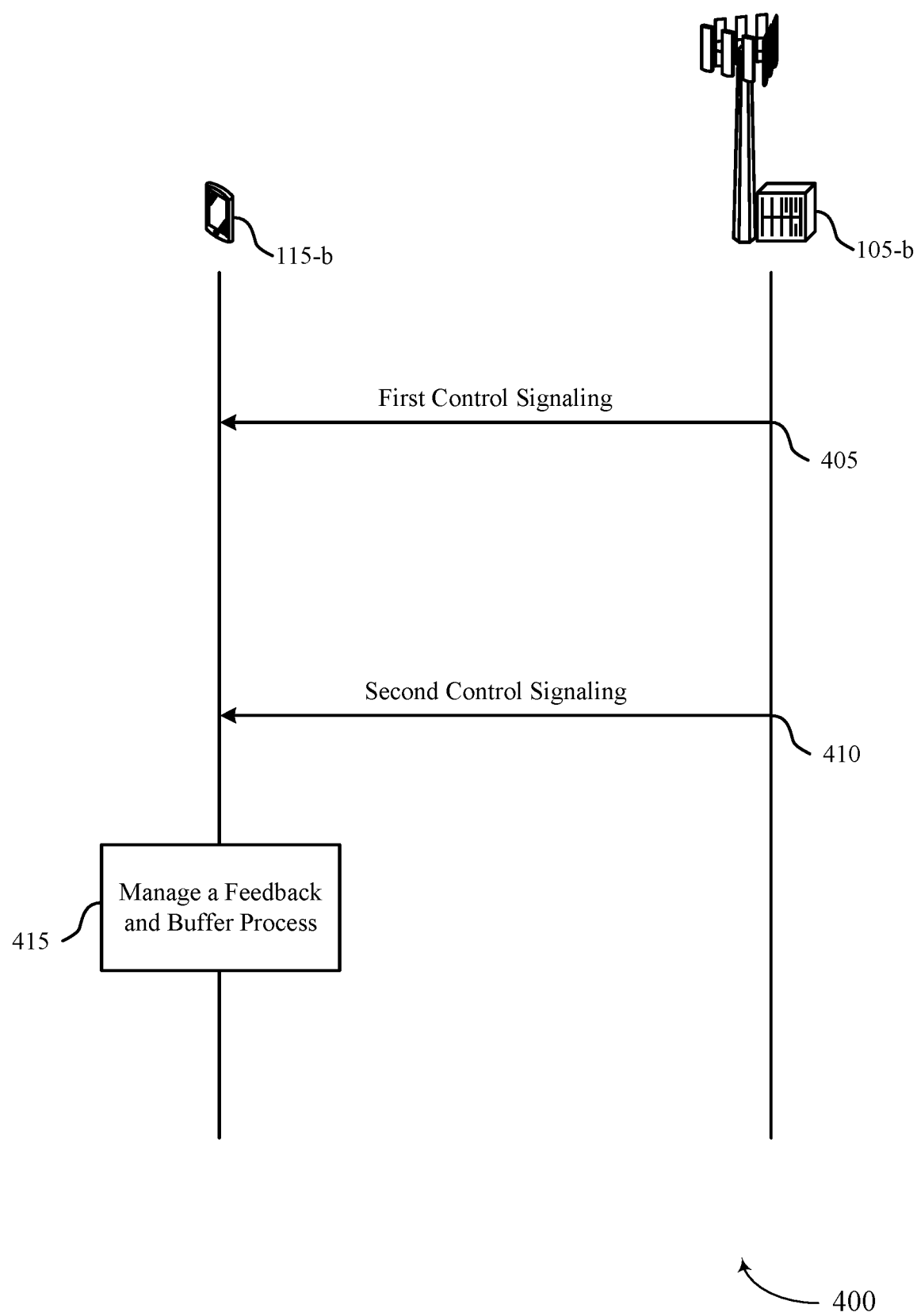
FIG. 4 illustrates an example of a process flow that supports multicast transmission feedback and buffer processing in accordance with aspects of the present disclosure.

FIG. 4 illustrates an example of a process flow 400 that supports multicast transmission feedback and buffer processing in accordance with aspects of the present disclosure. In some examples, process flow 400 may implement aspects of wireless communication systems 100 and 200. Process flow 400 includes UE 115-a, which may be an example of a UE 115 as described herein. Process flow 400 also includes base station 105-a, which may be example of a base station 105 as described herein.

At 405, UE 115-b may receive first control signaling indicating a first RNTI identifier and a first feedback process identifier (e.g., a first HPID). The first RNTI may indicate scheduling of a unicast downlink transmission. For example, the first RNTI may be a C-RNTI.

At 410, UE 115-b may receive second control signaling indicating a second RNTI and a second feedback process identifier (e.g., a second HPID). The second RNTI may indicate scheduling of a multicast downlink transmission. For example, the second RNTI may be a M-RNTI.

In some cases, UE 115-b may also receive control signaling indicating a buffer storage configuration for storing data associated with the multicast downlink transmission in a buffer. UE 115-b may identify an assignment of the second feedback process identifier to the multicast downlink transmission based on receiving the second control signaling.

In some cases, UE 115-b may receive configuration signaling indicating a semi-static assignment of a first set of feedback process identifiers for unicast downlink transmissions and a second set of feedback process identifiers for the multicast downlink transmissions. In these cases, UE 115-b may also identify a first data rate for the multicast downlink transmission and a second data rate for the unicast downlink transmission, where the first data rate and the second data rate are semi-statically configured based on a CC data rate. For example, the first data rate and the second data rate may be subject to a maximum or limited CC data rate, on a per-CC basis. In these cases, UE 115-b may also identify the first feedback process identifier from the first set of feedback process identifiers, and UE 115-b may identify the second feedback process identifier from the second set of feedback process identifiers.

In some cases, UE 115-b may receive configuration signaling that indicates a first feedback processing timeline for the unicast downlink transmission and a second feedback processing timeline for the multicast downlink transmission, where the first feedback processing timeline is different from the second feedback processing timeline.

At 415, UE 115-b may manage a feedback and buffer process (e.g., a HARQ process) at UE 115-b associated with the unicast downlink transmission and the multicast downlink transmission based on the first RNTI, the first feedback process identifier, the second RNTI, and the second feedback process identifier. For example, as described herein, in some cases the UE 115-b may treat a multicast transmission as if it were a unicast transmission by applying feedback process processing rules to the multicast transmission as if it were a unicast transmission.

UE 115-b may apply one or more feedback process processing rules to the unicast downlink transmission and the multicast downlink transmission according to a single feedback and buffer process for the unicast downlink transmission and the multicast downlink transmission. UE 115-b may also identify a first data rate for the multicast downlink transmission and a second data for the unicast downlink transmission, where the first data rate and the second data rate are dynamically configured based on a CC data rate.

In some cases, UE 115-b may store data associated with the multicast downlink transmission in a buffer. UE 115-b may label the stored data associated with the multicast downlink transmission with the second feedback process identifier.

In some cases, UE 115-b may determine to refrain from storing data associated with the multicast downlink transmission in a buffer based on the second feedback process identifier.

In some cases, UE 115-b may determine that the first feedback process identifier and the second feedback process identifier correspond to a same feedback process identifier value and that the first RNTI is different from the second RNTI. UE 115-b may then flush stored data from a buffer based on determining that the first feedback process identifier and the second feedback process identifier correspond to the same identifier value and that the first RNTI is different from the second RNTI.

In cases where UE 115-b receives configuration signaling indicate a semi-static assignment of feedback process identifiers, UE 115-b may manage a first feedback and buffer process for the unicast downlink transmission. UE 115-b may manage a second feedback and buffer process for the multicast downlink transmission, where the second feedback and buffer process is managed in parallel with the first feedback and buffer process. For example, the first feedback and buffer process may occur based on unicast soft buffer, and the second feedback and buffer process may occur based on a different multicast soft buffer. UE 115-b may apply one or more feedback process processing rules to both the unicast downlink transmission and the multicast downlink transmission across the first feedback and buffer process and the second feedback and buffer process.

UE 115-b may also identify a non-sequential ordering between a downlink data transmission and a corresponding feedback process identifier across the first feedback and buffer process and the second feedback and buffer process. Or, UE 115-b may identify a non-sequential ordering between a control channel transmission and a corresponding data transmission across the first feedback and buffer process and the second feedback and buffer process. In either case, UE 115-b may receive configuration signaling that configures a first set of PDCCH candidates for the first control signaling indicating the first RNTI and configures a second set of PDCCH for the second control signaling indicating the second RNTI.

UE 115-b may determine that the first feedback process identifier and the second feedback process identifier correspond to a same feedback process identifier value, and also that the first RNTI is different from the second RNTI. In these cases, UE 115-b may store data associated with the unicast downlink transmission in a first buffer according to the first feedback and buffer process. UE 115-b may also store data associated with the multicast downlink transmission in a second buffer according to the second feedback and buffer process.

Figure 5:
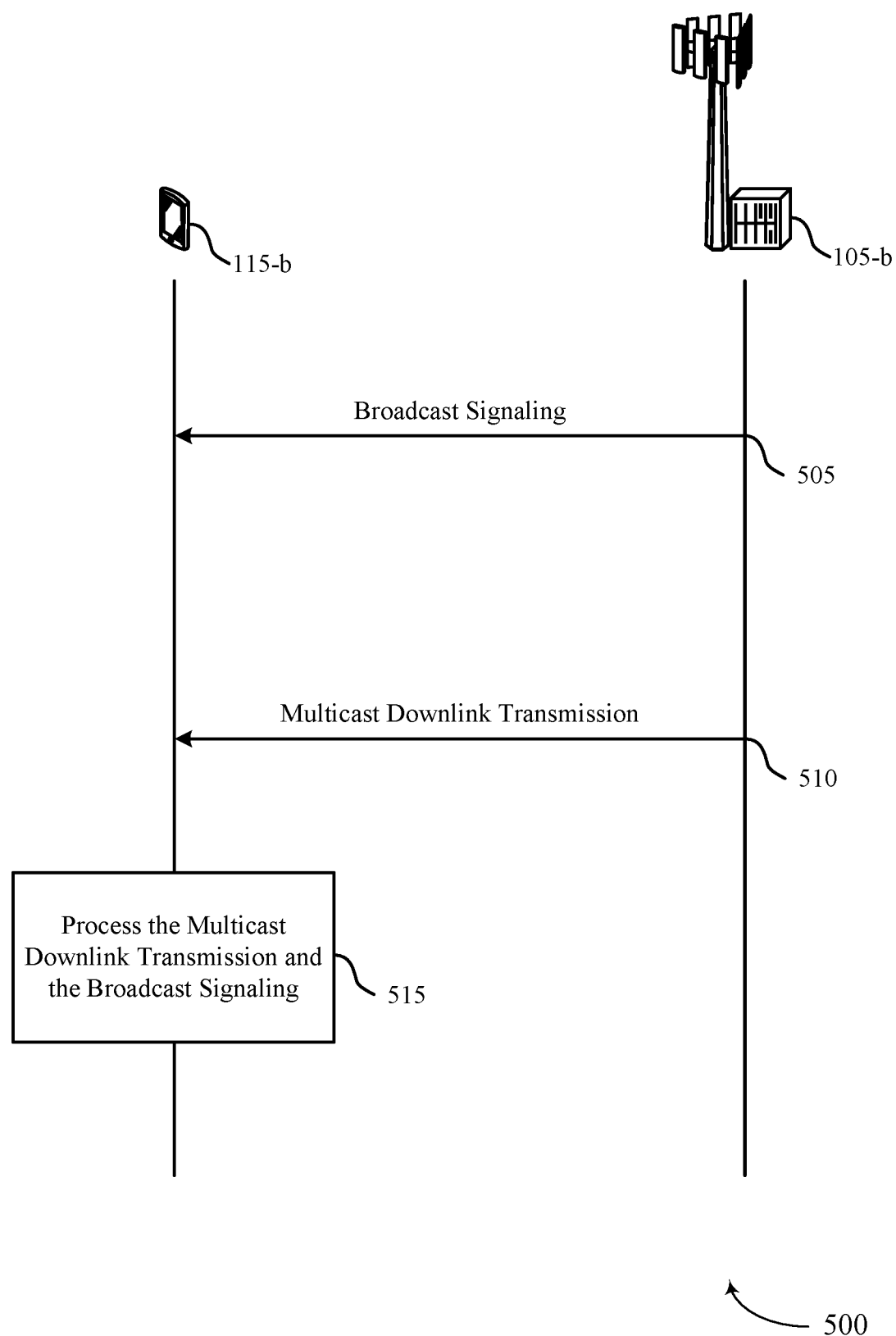
FIG. 5 illustrates an example of a process flow that supports multicast transmission feedback and buffer processing in accordance with aspects of the present disclosure.

FIG. 5 illustrates an example of a process flow 500 that supports multicast transmission feedback and buffer processing in accordance with aspects of the present disclosure. In some examples, process flow 500 may implement aspects of wireless communication systems 100 and 200. Process flow 500 includes UE 115-c, which may be an example of a UE 115 as described herein. Process flow 500 also includes base station 105-c, which may be example of a base station 105 as described herein.

At 505, UE 115-c may receive, from base station 105-b, broadcast signaling having a periodicity above a first threshold, a TB size below a second threshold, or both. In some cases, UE 115-c may receive configuration signaling indicating a processing allocation of a baseband processing budget between broadcast signaling processing, unicast signaling processing, and multicast signaling processing.

At 510, UE 115-c may receive a multicast downlink transmission that is configured without feedback processing. In some cases, UE 115-c may receive a unicast downlink transmission. In some cases, the multicast downlink transmission is received and processed while UE 115-c is in an idle state or an inactive state.

At 515, UE 115-c may process the multicast downlink transmission and the broadcast signaling during a same time period (e.g., simultaneously), based on a remainder of a baseband processing budget for broadcast signaling processing. UE 115-c may process the unicast downlink transmission, the multicast downlink transmission, and/or the broadcast signaling during the same time period based on the remainder of the baseband processing budget for broadcast signaling processing. The combined data rate for the unicast transmission and the multicast downlink transmission is less than a CC data rate.

Figure 6:
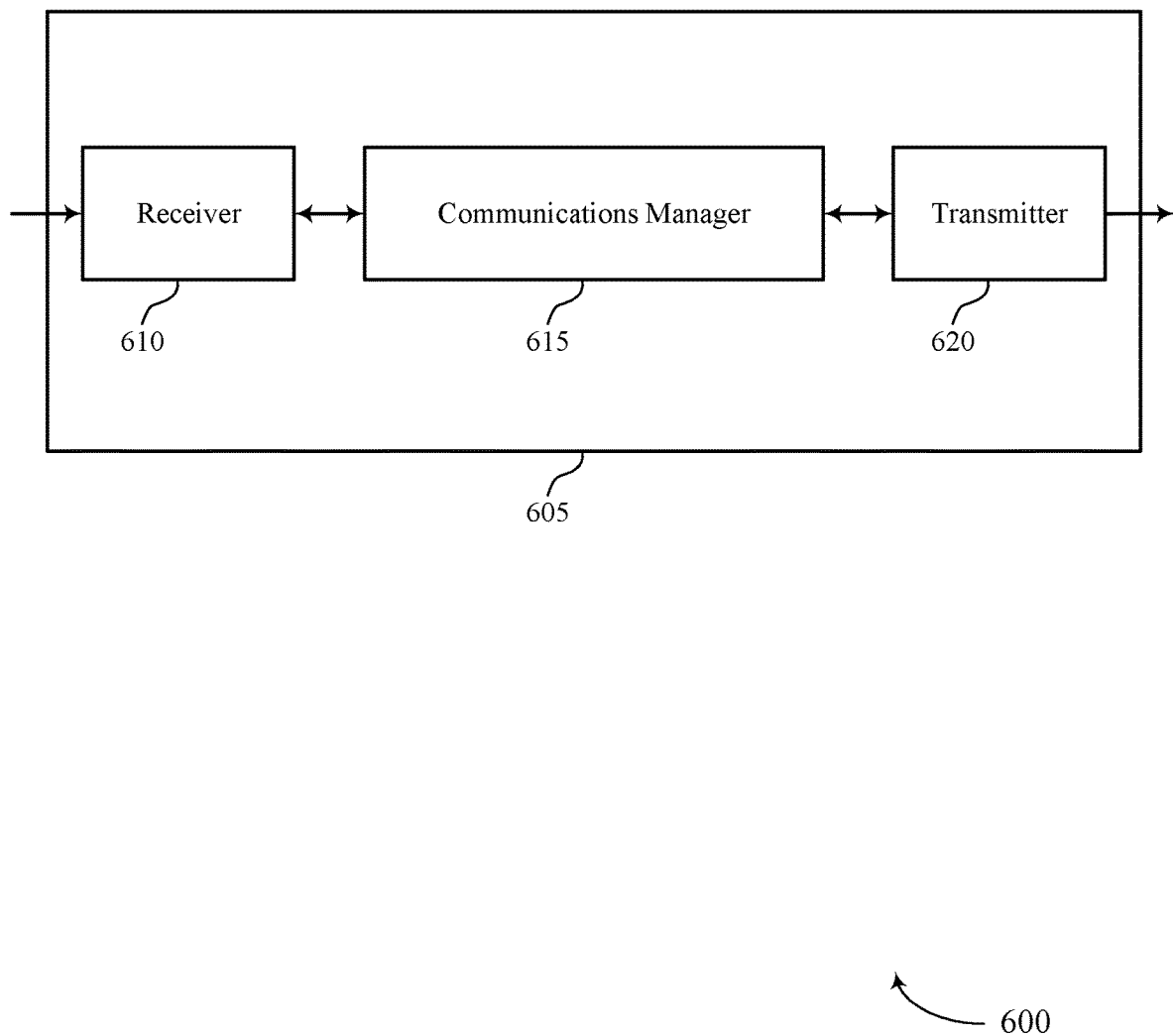
FIGS. 6 and 7 show block diagrams of devices that support multicast transmission feedback and buffer processing in accordance with aspects of the present disclosure.

FIG. 6 shows a block diagram 600 of a device 605 that supports multicast transmission feedback and buffer processing in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multicast transmission feedback and buffer processing, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive first control signaling indicating a first RNTI and a first feedback process identifier, where the first RNTI indicates scheduling of a unicast downlink transmission, receive second control signaling indicating a second RNTI and a second feedback process identifier, where the second RNTI indicates scheduling of a multicast downlink transmission, and manage a HARQ process at the UE associated with the unicast downlink transmission and the multicast downlink transmission based on the first RNTI, the first feedback process identifier, the second RNTI, and the second feedback process identifier. The communications manager 615 may also receive broadcast signaling having a periodicity above a first threshold, a transport block size below a second threshold, or both, receive a multicast downlink transmission that is configured without feedback processing, and process the multicast downlink transmission and the broadcast signaling during a same time period based on a remainder of a baseband processing budget for broadcast signaling processing. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a filed-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 described herein may be implemented as a chipset of a wireless modem, and the receiver 610 and the transmitter 620 may be implemented as sets of analog components (e.g., amplifiers, filters, phase shifters, antennas, etc.) The wireless modem may obtain and decode signals from the receiver 610 over a receive interface, and may output signals for transmission to the transmitter 620 over a transmit interface.

The actions performed by the UE communications manager 615 as described herein may be implemented to realize one or more potential advantages. One implementation may allow a UE 115 to save power and increase battery life by improving efficiency and communications reliability. The UE 115 may be configured to efficiently manage unicast buffers and multicast buffers to simultaneously manage HARQ feedback for both types of communications. The improved HARQ feedback may also improve efficiency by decreasing the number of retransmissions performed by the base station.

Figure 7:
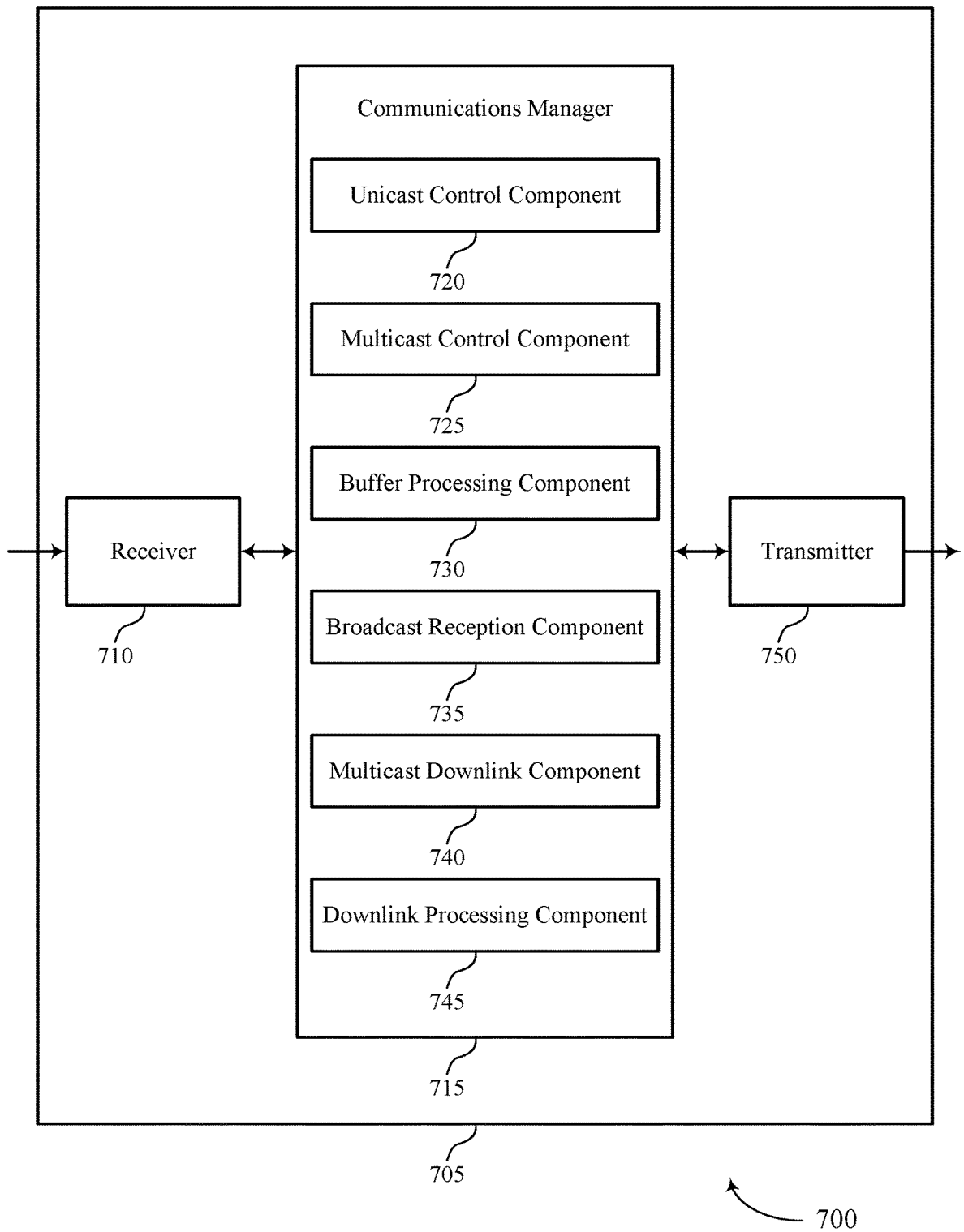

FIG. 7 shows a block diagram 700 of a device 705 that supports multicast transmission feedback and buffer processing in accordance with aspects of the present disclosure. The device 705 may be an example of aspects of a device 605, or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to multicast transmission feedback and buffer processing, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a unicast control component 720, a multicast control component 725, a buffer processing component 730, a broadcast reception component 735, a multicast downlink component 740, and a downlink processing component 745. The communications manager 715 may be an example of aspects of the communications manager 910 described herein.

The unicast control component 720 may receive first control signaling indicating a first RNTI and a first feedback process identifier, where the first RNTI indicates scheduling of a unicast downlink transmission.

The multicast control component 725 may receive second control signaling indicating a second RNTI and a second feedback process identifier, where the second RNTI indicates scheduling of a multicast downlink transmission.

The buffer processing component 730 may manage a HARQ process at the UE associated with the unicast downlink transmission and the multicast downlink transmission based on the first RNTI, the first feedback process identifier, the second RNTI, and the second feedback process identifier.

The broadcast reception component 735 may receive broadcast signaling having a periodicity above a first threshold, a transport block size below a second threshold, or both.

The multicast downlink component 740 may receive a multicast downlink transmission that is configured without feedback processing.

The downlink processing component 745 may process the multicast downlink transmission and the broadcast signaling during a same time period based on a remainder of a baseband processing budget for broadcast signaling processing.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

A processor of the UE 115 (e.g., controlling the receiver 710, the transmitter 750, or the transceiver 920 as described with reference for FIG. 9) may operate the components described herein to realize one or more potential advantages. For example, the processor may operate the receiver 710 to receive first control signaling indicating a first RNTI and first HPID for unicast transmissions, and also receive second control signaling indicating a second RNTI and a second HPID. The processor may operate a HARQ process to efficiently manage multiple types of data in multiple buffers. This may improve efficiency and communications reliability by providing flexibility in the HARQ feedback process, which may further decrease the number of retransmission performed by a base station 105.

The process may also operate the receiver 710 to receive broadcast signaling, and receive a multicast transmission. The processor may process the multicast transmission and the broadcast signaling during the same time period. This may improve efficiency and communications reliability by providing simultaneous processing, and may further decrease the number of retransmission performed by a base station 105.

Figure 8:
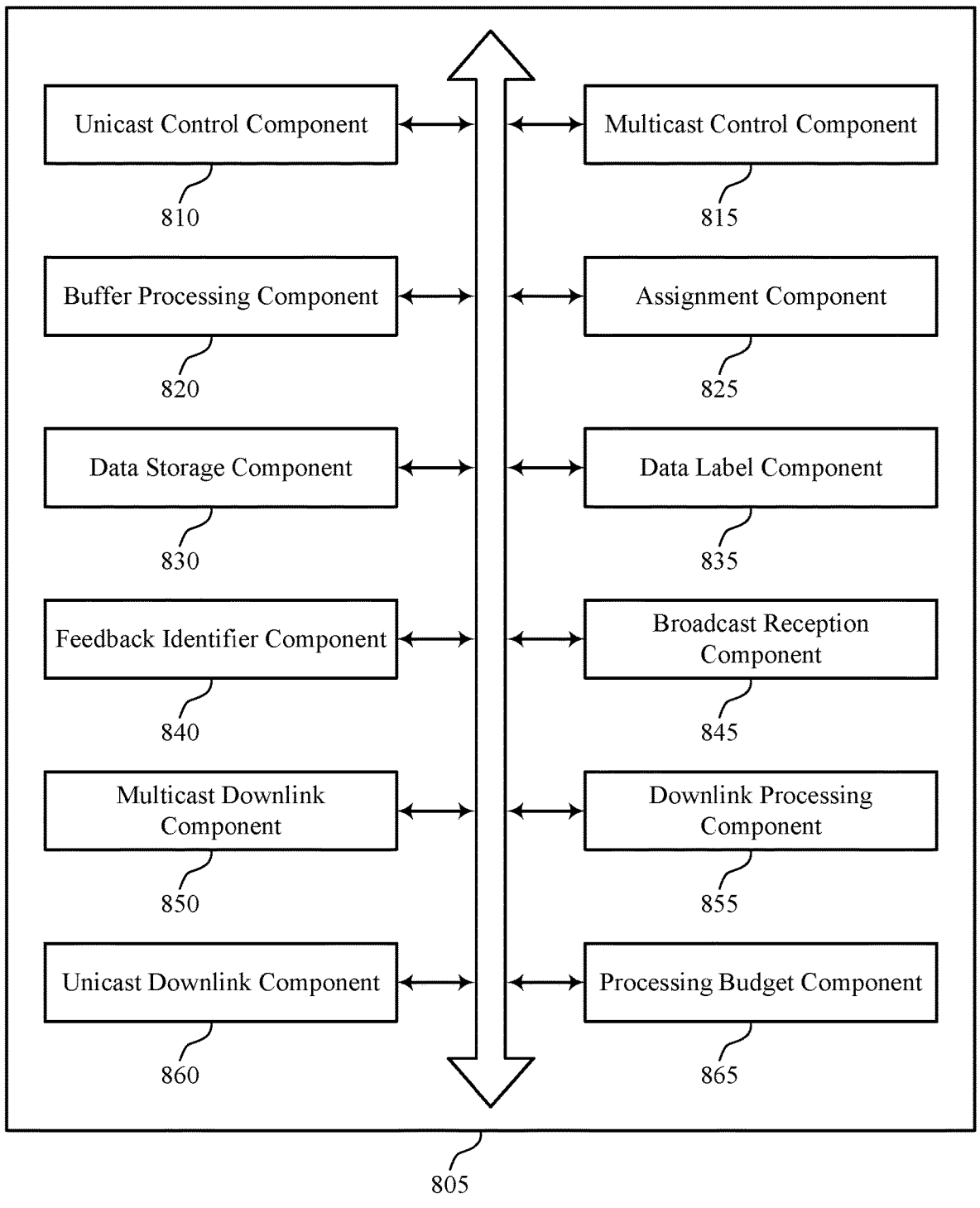
FIG. 8 shows a block diagram of a communications manager that supports multicast transmission feedback and buffer processing in accordance with aspects of the present disclosure.

FIG. 8 shows a block diagram 800 of a communications manager 805 that supports multicast transmission feedback and buffer processing in accordance with aspects of the present disclosure. The communications manager 805 may be an example of aspects of a communications manager 615, a communications manager 715, or a communications manager 910 described herein. The communications manager 805 may include an unicast control component 810, a multicast control component 815, a buffer processing component 820, an assignment component 825, a data storage component 830, a data label component 835, a feedback identifier component 840, a broadcast reception component 845, a multicast downlink component 850, a downlink processing component 855, an unicast downlink component 860, and a processing budget component 865. Each of these modules may communicate, directly or indirectly, with one another (e.g., via one or more buses).

The unicast control component 810 may receive first control signaling indicating a first RNTI and a first feedback process identifier, where the first RNTI indicates scheduling of a unicast downlink transmission.

The multicast control component 815 may receive second control signaling indicating a second RNTI and a second feedback process identifier, where the second RNTI indicates scheduling of a multicast downlink transmission.

The buffer processing component 820 may manage a HARQ process at the UE associated with the unicast downlink transmission and the multicast downlink transmission based on the first RNTI, the first feedback process identifier, the second RNTI, and the second feedback process identifier.

In some examples, the buffer processing component 820 may apply one or more feedback process processing rules to the unicast downlink transmission and the multicast downlink transmission according to a single HARQ process for the unicast downlink transmission and the multicast downlink transmission.

In some examples, the buffer processing component 820 may identify a first data rate for the multicast downlink transmission and a second data rate the unicast downlink transmission, where the first data rate and the second data rate are dynamically configured based on a CC data rate.

In some examples, the buffer processing component 820 may manage a first HARQ process for the unicast downlink transmission.

In some examples, the buffer processing component 820 may manage a second HARQ process for the multicast downlink transmission, where the second HARQ process is managed in parallel with the first HARQ process.

In some examples, the buffer processing component 820 may apply one or more feedback process processing rules to both the unicast downlink transmission and the multicast downlink transmission across the first HARQ process and the second HARQ process.

In some examples, the buffer processing component 820 may receive configuration signaling that indicates a first feedback processing timeline for the unicast downlink transmission and a second feedback processing timeline for the multicast downlink transmission, where the first feedback processing timeline is different from the second feedback processing timeline.

The broadcast reception component 845 may receive broadcast signaling having a periodicity above a first threshold, a transport block size below a second threshold, or both.

The multicast downlink component 850 may receive a multicast downlink transmission that is configured without feedback processing.

In some cases, the multicast downlink transmission is received and processed while the UE is in an idle state or an inactive state.

The downlink processing component 855 may process the multicast downlink transmission and the broadcast signaling during a same time period based on a remainder of a baseband processing budget for broadcast signaling processing.

In some examples, the downlink processing component 855 may process the unicast downlink transmission, the multicast downlink transmission, and the broadcast signaling during the same time period based on the remainder of the baseband processing budget for broadcast signaling processing.

In some cases, a combined data rate for the unicast downlink transmission and the multicast downlink transmission is less than a CC data rate.

The assignment component 825 may identify an assignment of the second feedback process identifier to the multicast downlink transmission based on receiving the second control signaling.

The data storage component 830 may store data associated with the multicast downlink transmission in a buffer.

In some examples, the data storage component 830 may determine to refrain from storing data associated with the multicast downlink transmission in a buffer based on the second feedback process identifier.

In some examples, the data storage component 830 may receive control signaling indicating a buffer storage configuration for storing data associated with the multicast downlink transmission in a buffer.

In some examples, the data storage component 830 may flush stored data from a buffer based on determining that the first feedback process identifier and the second feedback process identifier correspond to the same identifier value and that the first RNTI is different from the second RNTI.

In some examples, the data storage component 830 may identify a first data rate for the multicast downlink transmission and a second data rate the unicast downlink transmission, where the first data rate and the second data rate are semi-statically configured based on a CC data rate.

In some examples, the data storage component 830 may store data associated with the unicast downlink transmission in a first buffer according to the first HARQ process.

In some examples, the data storage component 830 may store data associated with the multicast downlink transmission in a second buffer according to the second HARQ process.

The data label component 835 may label the stored data associated with the multicast downlink transmission with the second feedback process identifier.

The feedback identifier component 840 may determine that the first feedback process identifier and the second feedback process identifier correspond to a same feedback process identifier value and that the first RNTI is different from the second RNTI.

In some examples, the feedback identifier component 840 may receive configuration signaling indicating a semi-static assignment of a first set of feedback process identifiers for unicast downlink transmissions and a second set of feedback process identifiers for multicast downlink transmissions.

In some examples, the feedback identifier component 840 may identify a non-sequential ordering between a downlink data transmission and a corresponding feedback process identifier across the first HARQ process and the second HARQ process or a non-sequential ordering between a control channel transmission and a corresponding data transmission across the first HARQ process and the second HARQ process.

In some examples, the feedback identifier component 840 may receive configuration signaling that configures a first set of physical downlink control channel candidates for the first control signaling indicating the first RNTI and configures a second set of physical downlink control channel candidates for the second control signaling indicating the second RNTI.

In some examples, the feedback identifier component 840 may determine that the first feedback process identifier and the second feedback process identifier correspond to a same feedback process identifier value and that the first RNTI is different from the second RNTI.

In some examples, the feedback identifier component 840 may identify the first feedback process identifier from the first set of feedback process identifiers.

In some examples, the feedback identifier component 840 may identify the second feedback process identifier from the second set of feedback process identifiers.

The unicast downlink component 860 may receive a unicast downlink transmission.

The processing budget component 865 may receive configuration signaling indicating a processing allocation of a baseband processing budget between broadcast signaling processing, unicast signaling processing, and multicast signaling processing.

Figure 9:
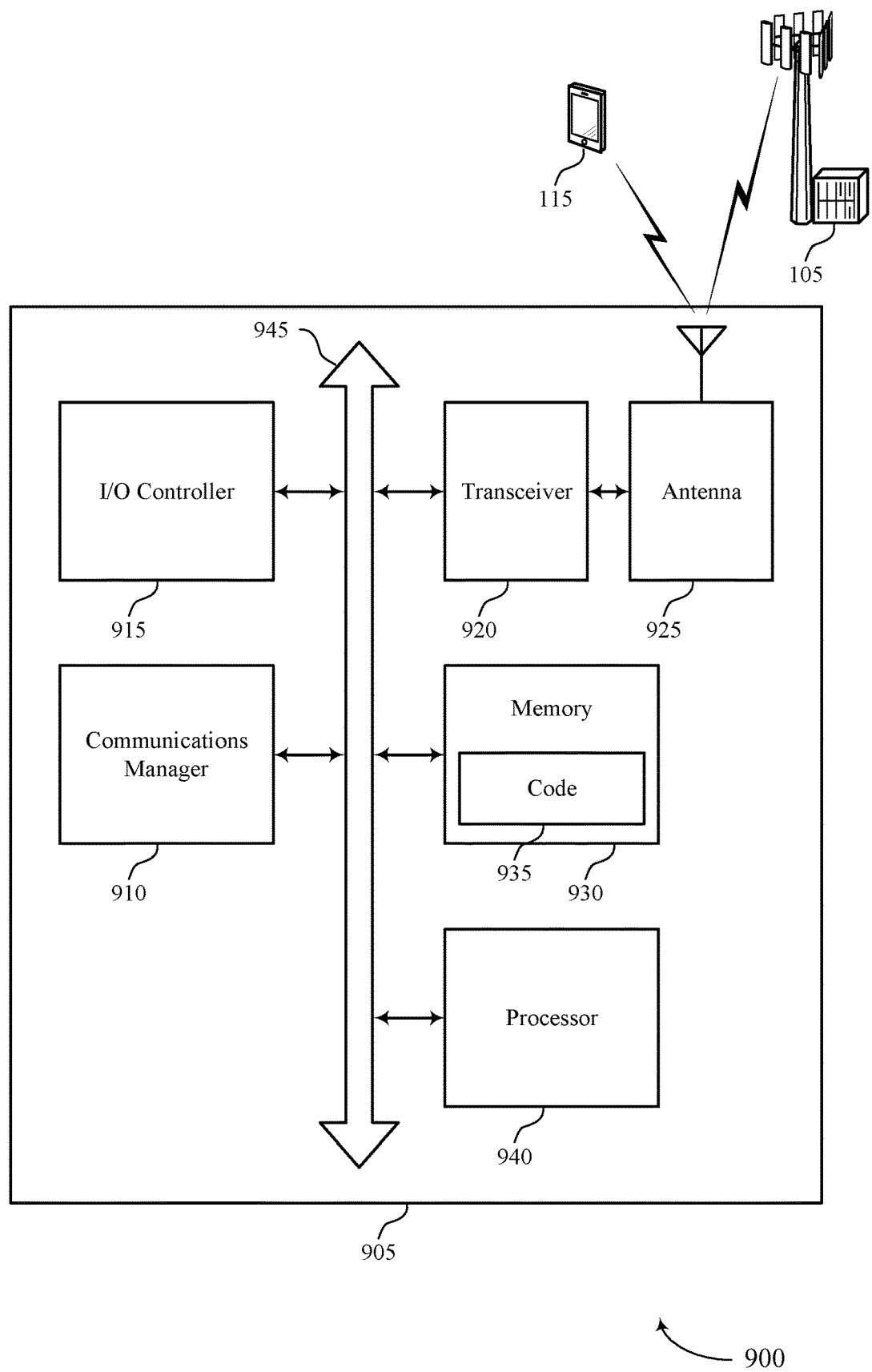
FIG. 9 shows a diagram of a system including a device that supports multicast transmission feedback and buffer processing in accordance with aspects of the present disclosure.

FIG. 9 shows a diagram of a system 900 including a device 905 that supports multicast transmission feedback and buffer processing in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive first control signaling indicating a first RNTI and a first feedback process identifier, where the first RNTI indicates scheduling of a unicast downlink transmission, receive second control signaling indicating a second RNTI and a second feedback process identifier, where the second RNTI indicates scheduling of a multicast downlink transmission, and manage a HARQ process at the UE associated with the unicast downlink transmission and the multicast downlink transmission based on the first RNTI, the first feedback process identifier, the second RNTI, and the second feedback process identifier. The communications manager 910 may also receive broadcast signaling having a periodicity above a first threshold, a transport block size below a second threshold, or both, receive a multicast downlink transmission that is configured without feedback processing, and process the multicast downlink transmission and the broadcast signaling during a same time period based on a remainder of a baseband processing budget for broadcast signaling processing.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting multicast transmission feedback and buffer processing).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
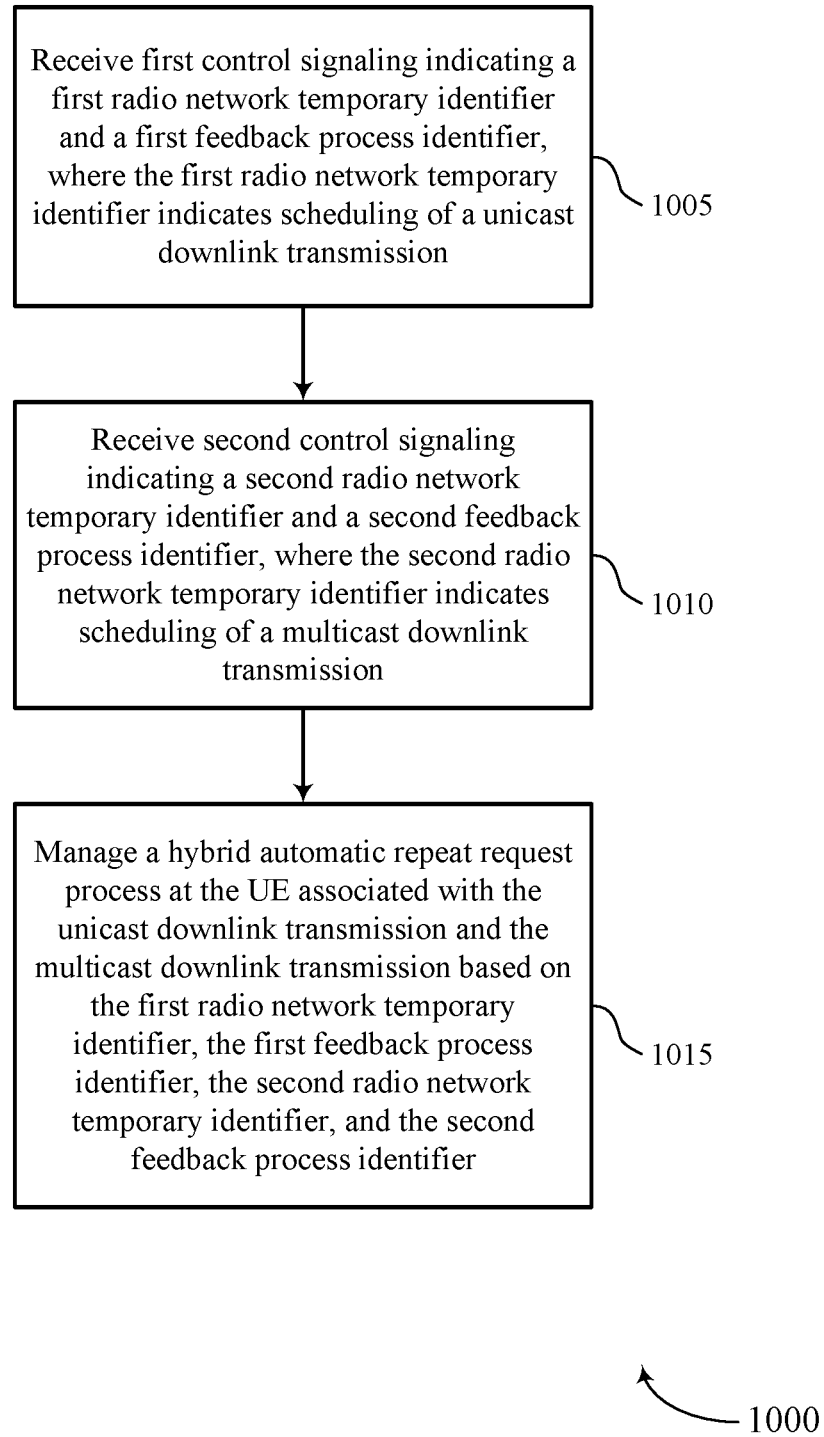
FIGS. 10 through 13 show flowcharts illustrating methods that support multicast transmission feedback and buffer processing in accordance with aspects of the present disclosure.

FIG. 10 shows a flowchart illustrating a method 1000 that supports multicast transmission feedback and buffer processing in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may receive first control signaling indicating a first RNTI and a first feedback process identifier, where the first RNTI indicates scheduling of a unicast downlink transmission. The operations of 1005 may be performed according to the methods described herein. In some examples, aspects of the operations of 1005 may be performed by a unicast control component as described with reference to FIGS. 6 through 9. Additionally or alternatively, means for performing 1005 may, but not necessarily, include, for example, antenna 925, transceiver 920, communications manager 910, memory 930 (including code 935), processor 940 and/or bus 945.

At 1010, the UE may receive second control signaling indicating a second RNTI and a second feedback process identifier, where the second RNTI indicates scheduling of a multicast downlink transmission. The operations of 1010 may be performed according to the methods described herein. In some examples, aspects of the operations of 1010 may be performed by a multicast control component as described with reference to FIGS. 6 through 9. Additionally or alternatively, means for performing 1010 may, but not necessarily, include, for example, antenna 925, transceiver 920, communications manager 910, memory 930 (including code 935), processor 940 and/or bus 945.

At 1015, the UE may manage a HARQ process at the UE associated with the unicast downlink transmission and the multicast downlink transmission based on the first RNTI, the first feedback process identifier, the second RNTI, and the second feedback process identifier. The operations of 1015 may be performed according to the methods described herein. In some examples, aspects of the operations of 1015 may be performed by a buffer processing component as described with reference to FIGS. 6 through 9. Additionally or alternatively, means for performing 1015 may, but not necessarily, include, for example, antenna 925, transceiver 920, communications manager 910, memory 930 (including code 935), processor 940 and/or bus 945.

Figure 11:
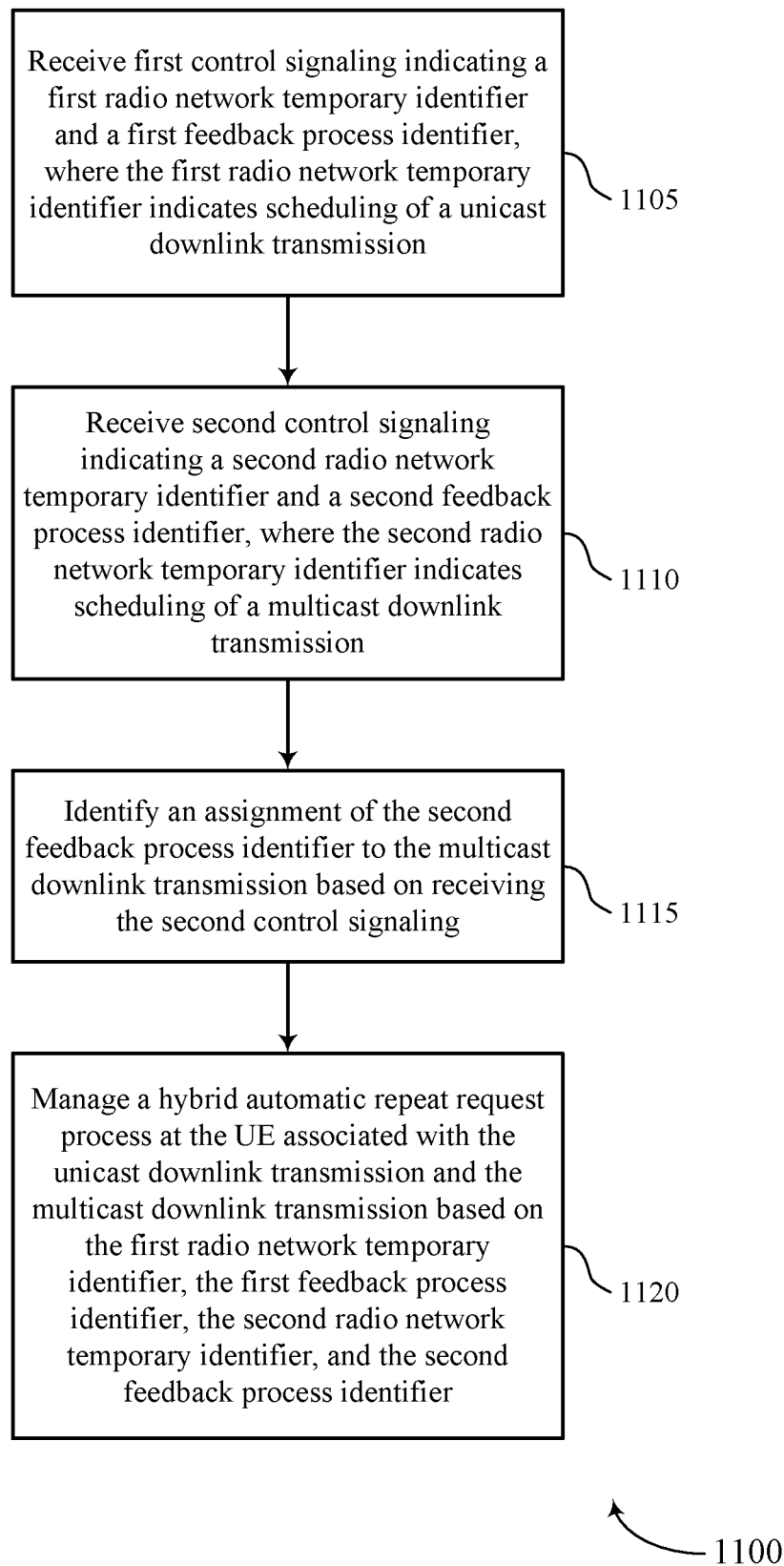

FIG. 11 shows a flowchart illustrating a method 1100 that supports multicast transmission feedback and buffer processing in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may receive first control signaling indicating a first RNTI and a first feedback process identifier, where the first RNTI indicates scheduling of a unicast downlink transmission. The operations of 1105 may be performed according to the methods described herein. In some examples, aspects of the operations of 1105 may be performed by a unicast control component as described with reference to FIGS. 6 through 9. Additionally or alternatively, means for performing 1105 may, but not necessarily, include, for example, antenna 925, transceiver 920, communications manager 910, memory 930 (including code 935), processor 940 and/or bus 945.

At 1110, the UE may receive second control signaling indicating a second RNTI and a second feedback process identifier, where the second RNTI indicates scheduling of a multicast downlink transmission. The operations of 1110 may be performed according to the methods described herein. In some examples, aspects of the operations of 1110 may be performed by a multicast control component as described with reference to FIGS. 6 through 9. Additionally or alternatively, means for performing 1110 may, but not necessarily, include, for example, antenna 925, transceiver 920, communications manager 910, memory 930 (including code 935), processor 940 and/or bus 945.

At 1115, the UE may identify an assignment of the second feedback process identifier to the multicast downlink transmission based on receiving the second control signaling. The operations of 1115 may be performed according to the methods described herein. In some examples, aspects of the operations of 1115 may be performed by an assignment component as described with reference to FIGS. 6 through 9. Additionally or alternatively, means for performing 1115 may, but not necessarily, include, for example, antenna 925, transceiver 920, communications manager 910, memory 930 (including code 935), processor 940 and/or bus 945.

At 1120, the UE may manage a HARQ process at the UE associated with the unicast downlink transmission and the multicast downlink transmission based on the first RNTI, the first feedback process identifier, the second RNTI, and the second feedback process identifier. The operations of 1120 may be performed according to the methods described herein. In some examples, aspects of the operations of 1120 may be performed by a buffer processing component as described with reference to FIGS. 6 through 9. Additionally or alternatively, means for performing 1120 may, but not necessarily, include, for example, antenna 925, transceiver 920, communications manager 910, memory 930 (including code 935), processor 940 and/or bus 945.

Figure 12:
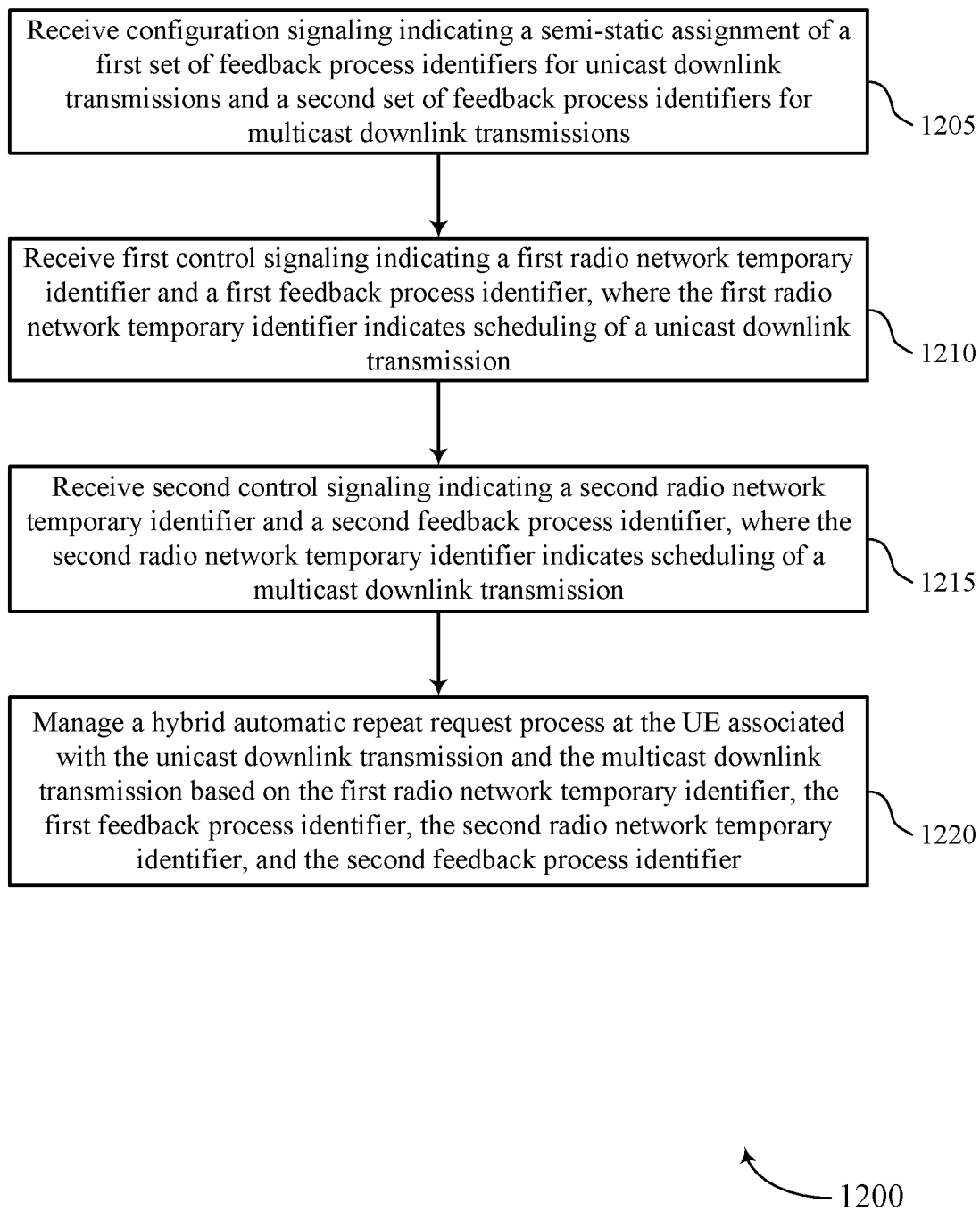

FIG. 12 shows a flowchart illustrating a method 1200 that supports multicast transmission feedback and buffer processing in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may receive configuration signaling indicating a semi-static assignment of a first set of feedback process identifiers for unicast downlink transmissions and a second set of feedback process identifiers for multicast downlink transmissions. The operations of 1205 may be performed according to the methods described herein. In some examples, aspects of the operations of 1205 may be performed by a feedback identifier component as described with reference to FIGS. 6 through 9. Additionally or alternatively, means for performing 1205 may, but not necessarily, include, for example, antenna 925, transceiver 920, communications manager 910, memory 930 (including code 935), processor 940 and/or bus 945.

At 1210, the UE may receive first control signaling indicating a first RNTI and a first feedback process identifier, where the first RNTI indicates scheduling of a unicast downlink transmission. The operations of 1210 may be performed according to the methods described herein. In some examples, aspects of the operations of 1210 may be performed by a unicast control component as described with reference to FIGS. 6 through 9. Additionally or alternatively, means for performing 1210 may, but not necessarily, include, for example, antenna 925, transceiver 920, communications manager 910, memory 930 (including code 935), processor 940 and/or bus 945.

At 1215, the UE may receive second control signaling indicating a second RNTI and a second feedback process identifier, where the second RNTI indicates scheduling of a multicast downlink transmission. The operations of 1215 may be performed according to the methods described herein. In some examples, aspects of the operations of 1215 may be performed by a multicast control component as described with reference to FIGS. 6 through 9. Additionally or alternatively, means for performing 1215 may, but not necessarily, include, for example, antenna 925, transceiver 920, communications manager 910, memory 930 (including code 935), processor 940 and/or bus 945.

At 1220, the UE may manage a HARQ process at the UE associated with the unicast downlink transmission and the multicast downlink transmission based on the first RNTI, the first feedback process identifier, the second RNTI, and the second feedback process identifier. The operations of 1220 may be performed according to the methods described herein. In some examples, aspects of the operations of 1220 may be performed by a buffer processing component as described with reference to FIGS. 6 through 9. Additionally or alternatively, means for performing 1220 may, but not necessarily, include, for example, antenna 925, transceiver 920, communications manager 910, memory 930 (including code 935), processor 940 and/or bus 945.

Figure 13:
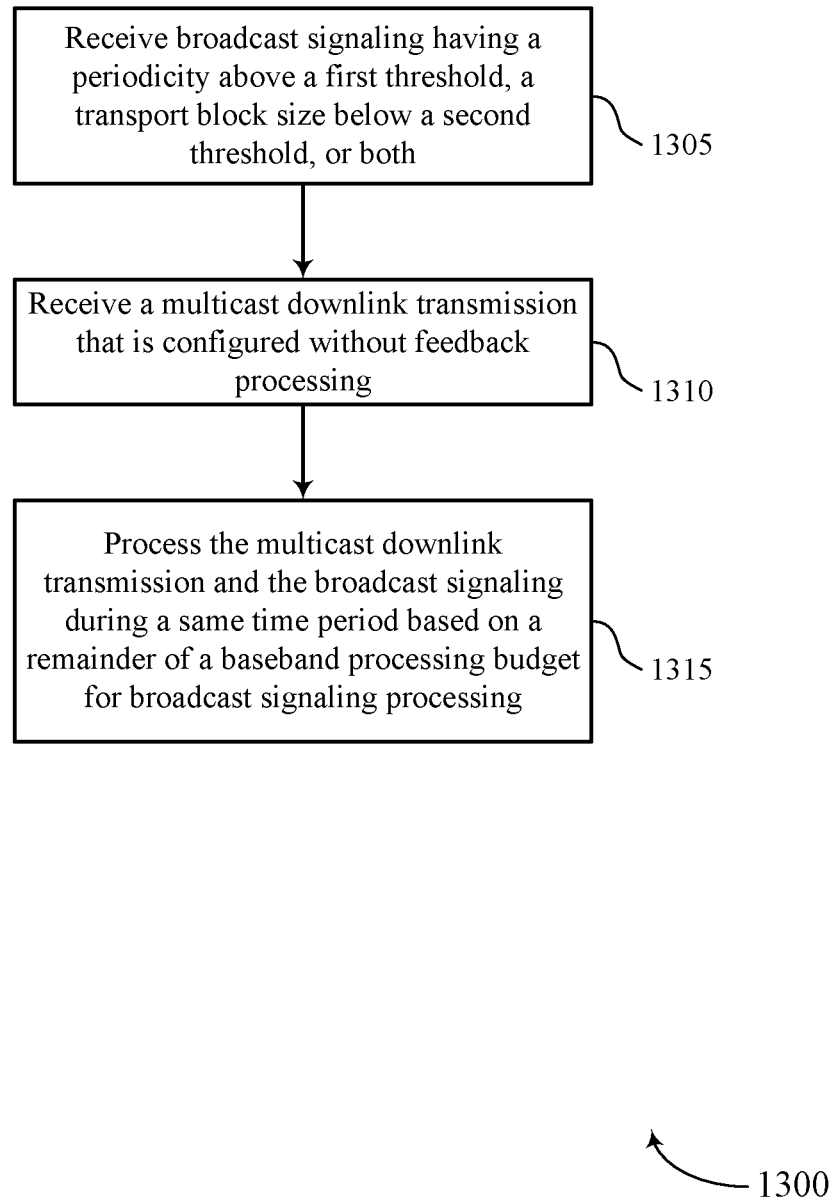

FIG. 13 shows a flowchart illustrating a method 1300 that supports multicast transmission feedback and buffer processing in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may receive broadcast signaling having a periodicity above a first threshold, a transport block size below a second threshold, or both. The operations of 1305 may be performed according to the methods described herein. In some examples, aspects of the operations of 1305 may be performed by a broadcast reception component as described with reference to FIGS. 6 through 9. Additionally or alternatively, means for performing 1305 may, but not necessarily, include, for example, antenna 925, transceiver 920, communications manager 910, memory 930 (including code 935), processor 940 and/or bus 945.

At 1310, the UE may receive a multicast downlink transmission that is configured without feedback processing. The operations of 1310 may be performed according to the methods described herein. In some examples, aspects of the operations of 1310 may be performed by a multicast downlink component as described with reference to FIGS. 6 through 9. Additionally or alternatively, means for performing 1310 may, but not necessarily, include, for example, antenna 925, transceiver 920, communications manager 910, memory 930 (including code 935), processor 940 and/or bus 945.

At 1315, the UE may process the multicast downlink transmission and the broadcast signaling during a same time period based on a remainder of a baseband processing budget for broadcast signaling processing. The operations of 1315 may be performed according to the methods described herein. In some examples, aspects of the operations of 1315 may be performed by a downlink processing component as described with reference to FIGS. 6 through 9. Additionally or alternatively, means for performing 1315 may, but not necessarily, include, for example, antenna 925, transceiver 920, communications manager 910, memory 930 (including code 935), processor 940 and/or bus 945.

The following provides an overview of aspects of the present disclosure:

Aspect 1: A method for wireless communications at a UE, comprising: receiving first control signaling indicating a first radio network temporary identifier and a first feedback process identifier, wherein the first radio network temporary identifier indicates scheduling of a unicast downlink transmission; receiving second control signaling indicating a second radio network temporary identifier and a second feedback process identifier, wherein the second radio network temporary identifier indicates scheduling of a multicast downlink transmission; and managing a HARQ process at the UE associated with the unicast downlink transmission and the multicast downlink transmission based at least in part on the first radio network temporary identifier, the first feedback process identifier, the second radio network temporary identifier, and the second feedback process identifier.

Aspect 2: The method of aspect 1, further comprising: identifying an assignment of the second feedback process identifier to the multicast downlink transmission based at least in part on receiving the second control signaling.

Aspect 3: The method of aspect 2, further comprising: storing data associated with the multicast downlink transmission in a buffer; and labeling the stored data associated with the multicast downlink transmission with the second feedback process identifier.

Aspect 4: The method of any of aspects 2 through 3, further comprising: determining to refrain from storing data associated with the multicast downlink transmission in a buffer based at least in part on the second feedback process identifier.

Aspect 5: The method of any of aspects 2 through 4, further comprising: receiving control signaling indicating a buffer storage configuration for storing data associated with the multicast downlink transmission in a buffer.

Aspect 6: The method of any of aspects 2 through 5, further comprising: determining that the first feedback process identifier and the second feedback process identifier correspond to a same feedback process identifier value and that the first radio network temporary identifier is different from the second radio network temporary identifier; and flushing stored data from a buffer based at least in part on determining that the first feedback process identifier and the second feedback process identifier correspond to the same identifier value and that the first radio network temporary identifier is different from the second radio network temporary identifier.

Aspect 7: The method of any of aspects 2 through 6, further comprising: applying one or more feedback process processing rules to the unicast downlink transmission and the multicast downlink transmission according to a single HARQ process for the unicast downlink transmission and the multicast downlink transmission.

Aspect 8: The method of any of aspects 2 through 7, further comprising: identifying a first data rate for the multicast downlink transmission and a second data rate for the unicast downlink transmission, wherein the first data rate and the second data rate are dynamically configured based at least in part on a component carrier data rate.

Aspect 9: The method of any of aspects 1 through 8, further comprising: receiving configuration signaling indicating a semi-static assignment of a first plurality of feedback process identifiers for unicast downlink transmissions and a second plurality of feedback process identifiers for multicast downlink transmissions.

Aspect 10: The method of aspect 9, further comprising: managing a first HARQ process for the unicast downlink transmission; and managing a second HARQ process for the multicast downlink transmission, wherein the second HARQ process is managed in parallel with the first HARQ process.

Aspect 11: The method of aspect 10, further comprising: applying one or more feedback process processing rules to both the unicast downlink transmission and the multicast downlink transmission across the first HARQ process and the second HARQ process.

Aspect 12: The method of any of aspects 10 through 11, further comprising: identifying a non-sequential ordering between a downlink data transmission and a corresponding feedback process identifier across the first HARQ process and the second HARQ process or a non-sequential ordering between a control channel transmission and a corresponding data transmission across the first HARQ process and the second HARQ process.

Aspect 13: The method of aspect 12, further comprising: receiving configuration signaling that configures a first set of physical downlink control channel candidates for the first control signaling indicating the first radio network temporary identifier and configures a second set of physical downlink control channel candidates for the second control signaling indicating the second radio network temporary identifier.

Aspect 14: The method of any of aspects 10 through 13, further comprising: receiving configuration signaling that indicates a first feedback processing timeline for the unicast downlink transmission and a second feedback processing timeline for the multicast downlink transmission, wherein the first feedback processing timeline is different from the second feedback processing timeline.

Aspect 15: The method of any of aspects 10 through 14, further comprising: identifying a first data rate for the multicast downlink transmission and a second data rate for the unicast downlink transmission, wherein the first data rate and the second data rate are semi-statically configured based at least in part on a component carrier data rate.

Aspect 16: The method of any of aspects 10 through 15, further comprising: determining that the first feedback process identifier and the second feedback process identifier correspond to a same feedback process identifier value and that the first radio network temporary identifier is different from the second radio network temporary identifier; storing data associated with the unicast downlink transmission in a first buffer according to the first HARQ process; and storing data associated with the multicast downlink transmission in a second buffer according to the second HARQ process.

Aspect 17: The method of any of aspects 9 through 16, further comprising: identifying the first feedback process identifier from the first plurality of feedback process identifiers; and identifying the second feedback process identifier from the second plurality of feedback process identifiers.

Aspect 18: A method for wireless communications at a UE, comprising: receiving broadcast signaling having a periodicity above a first threshold, a transport block size below a second threshold, or both; receiving a multicast downlink transmission that is configured without feedback processing; and processing the multicast downlink transmission and the broadcast signaling during a same time period based at least in part on a remainder of a baseband processing budget for broadcast signaling processing.

Aspect 19: The method of aspect 18, further comprising: receiving a unicast downlink transmission; and processing the unicast downlink transmission, the multicast downlink transmission, and the broadcast signaling during the same time period based at least in part on the remainder of the baseband processing budget for broadcast signaling processing.

Aspect 20: The method of aspect 19, wherein a combined data rate for the unicast downlink transmission and the multicast downlink transmission is less than a component carrier data rate.

Aspect 21: The method of any of aspects 18 through 20, further comprising: receiving configuration signaling indicating a processing allocation of a baseband processing budget between broadcast signaling processing, unicast signaling processing, and multicast signaling processing.

Aspect 22: The method of any of aspects 18 through 21, wherein the multicast downlink transmission is received and processed while the UE is in an idle state or an inactive state.

Aspect 23: An apparatus for wireless communications at a UE, comprising a processor; memory coupled with the processor; and instructions stored in the memory and executable by the processor to cause the apparatus to perform a method of any of aspects 1 through 17.

Aspect 24: An apparatus for wireless communications at a UE, comprising at least one means for performing a method of any of aspects 1 through 17.

Aspect 25: A non-transitory computer-readable medium storing code for wireless communications at a UE, the code comprising instructions executable by a processor to perform a method of any of aspects 1 through 17.

Aspect 26: An apparatus for wireless communications at a UE, comprising a processor; memory coupled with the processor; and instructions stored in the memory and executable by the processor to cause the apparatus to perform a method of any of aspects 18 through 22.

Aspect 27: An apparatus for wireless communications at a UE, comprising at least one means for performing a method of any of aspects 18 through 22.

Aspect 28: A non-transitory computer-readable medium storing code for wireless communications at a UE, the code comprising instructions executable by a processor to perform a method of any of aspects 18 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving first control signaling indicating a first radio network temporary identifier and a first feedback process identifier, wherein the first radio network temporary identifier indicates scheduling of a unicast downlink transmission;
   receiving second control signaling indicating a second radio network temporary identifier and a second feedback process identifier, wherein the second radio network temporary identifier indicates scheduling of a multicast downlink transmission, wherein a combined data rate for the unicast downlink transmission and the multicast downlink transmission is less than a component carrier data rate; and
   processing the multicast downlink transmission or the unicast downlink transmission as a new data transmission irrespective of whether a new data indicator value is toggled in the first control signaling or the second control signaling, the processing based at least in part on the first radio network temporary identifier, the first feedback process identifier, the second radio network temporary identifier, and the second feedback process identifier.

2. The method of claim 1, further comprising:
   identifying an assignment of the second feedback process identifier to the multicast downlink transmission based at least in part on receiving the second control signaling.

3. The method of claim 2, further comprising:
   storing data associated with the multicast downlink transmission in a buffer; and
   labeling the stored data associated with the multicast downlink transmission with the second feedback process identifier.

4. The method of claim 2, further comprising:
   determining to refrain from storing data associated with the multicast downlink transmission in a buffer based at least in part on the second feedback process identifier.

5. The method of claim 2, further comprising:
   receiving control signaling indicating a buffer storage configuration for storing data associated with the multicast downlink transmission in a buffer.

6. The method of claim 2, further comprising:
   determining that the first feedback process identifier and the second feedback process identifier correspond to a same feedback process identifier value and that the first radio network temporary identifier is different from the second radio network temporary identifier; and
   flushing stored data from a buffer based at least in part on determining that the first feedback process identifier and the second feedback process identifier correspond to the same identifier value and that the first radio network temporary identifier is different from the second radio network temporary identifier.

7. The method of claim 2, further comprising:
   applying one or more feedback process processing rules to the unicast downlink transmission and the multicast downlink transmission according to a single hybrid automatic repeat request process for the unicast downlink transmission and the multicast downlink transmission.

8. The method of claim 2, further comprising:
   identifying a first data rate for the multicast downlink transmission and a second data rate for the unicast downlink transmission, wherein the first data rate and the second data rate are dynamically configured based at least in part on the component carrier data rate.

9. The method of claim 1, further comprising:
   receiving configuration signaling indicating a semi-static assignment of a first plurality of feedback process identifiers for unicast downlink transmissions and a second plurality of feedback process identifiers for multicast downlink transmissions.

10. The method of claim 9, further comprising:
    managing a first hybrid automatic repeat request process for the unicast downlink transmission; and managing a second hybrid automatic repeat request process for the multicast downlink transmission, wherein the second hybrid automatic repeat request process is managed in parallel with the first hybrid automatic repeat request process.

11. The method of claim 10, further comprising:
applying one or more feedback process processing rules to both the unicast downlink transmission and the multicast downlink transmission across the first hybrid automatic repeat request process and the second hybrid automatic repeat request process.

12. The method of claim 10, further comprising:
identifying a non-sequential ordering between a downlink data transmission and a corresponding feedback process identifier across the first hybrid automatic repeat request process and the second hybrid automatic repeat request process or a non-sequential ordering between a control channel transmission and a corresponding data transmission across the first hybrid automatic repeat request process and the second hybrid automatic repeat request process.

13. The method of claim 1, further comprising:
receiving configuration signaling that configures a first set of physical downlink control channel candidates for the first control signaling indicating the first radio network temporary identifier and configures a second set of physical downlink control channel candidates for the second control signaling indicating the second radio network temporary identifier.

14. The method of claim 1, further comprising:
receiving configuration signaling that indicates a first feedback processing timeline for the unicast downlink transmission and a second feedback processing timeline for the multicast downlink transmission, wherein the first feedback processing timeline is different from the second feedback processing timeline.

15. The method of claim 10, further comprising:
identifying a first data rate for the multicast downlink transmission and a second data rate for the unicast downlink transmission, wherein the first data rate and the second data rate are semi-statically configured based at least in part on the component carrier data rate.

16. The method of claim 10, further comprising:
determining that the first feedback process identifier and the second feedback process identifier correspond to a same feedback process identifier value and that the first radio network temporary identifier is different from the second radio network temporary identifier;
storing data associated with the unicast downlink transmission in a first buffer according to the first hybrid automatic repeat request process; and
storing data associated with the multicast downlink transmission in a second buffer according to the second hybrid automatic repeat request process.

17. The method of claim 9, further comprising:
identifying the first feedback process identifier from the first plurality of feedback process identifiers; and
identifying the second feedback process identifier from the second plurality of feedback process identifiers.

18. A method for wireless communications at a user equipment (UE), comprising:
receiving broadcast signaling having a periodicity above a first threshold, a transport block size below a second threshold, or both;
receiving a multicast downlink transmission that is configured without feedback processing and a unicast downlink transmission, wherein a combined data rate for the unicast downlink transmission and the multicast downlink transmission is less than a component carrier data rate; and
processing the multicast downlink transmission and the broadcast signaling during a same time period based at least in part on a remainder of a baseband processing budget for broadcast signaling processing.

19. The method of claim 18, further comprising:
transmission, and the broadcast signaling during the same time period based at least in part on the remainder of the baseband processing budget for broadcast signaling processing.

20. The method of claim 18, further comprising:
receiving configuration signaling indicating a processing allocation of the baseband processing budget among broadcast signaling processing, unicast signaling processing, and multicast signaling processing.

21. The method of claim 18, wherein the multicast downlink transmission is received and processed while the UE is in an idle state or an inactive state.

22. An apparatus for wireless communications at a user equipment (UE), comprising:
a processor,
memory coupled with the processor; and
instructions stored in the memory and executable by the processor to cause the apparatus to:
receive first control signaling indicating a first radio network temporary identifier and a first feedback process identifier, wherein the first radio network temporary identifier indicates scheduling of a unicast downlink transmission;
receive second control signaling indicating a second radio network temporary identifier and a second feedback process identifier, wherein the second radio network temporary identifier indicates scheduling of a multicast downlink transmission, wherein a combined data rate for the unicast downlink transmission and the multicast downlink transmission is less than a component carrier data rate; and
process the multicast downlink transmission or the unicast downlink transmission as a new data transmission irrespective of whether a new data indicator value is toggled in the first control signaling or the second control signaling, the processing based at least in part on the first radio network temporary identifier, the first feedback process identifier, the second radio network temporary identifier, and the second feedback process identifier.

23. The apparatus of claim 22, wherein the instructions are further executable by the processor to cause the apparatus to:
identify an assignment of the second feedback process identifier to the multicast downlink transmission based at least in part on receiving the second control signaling.

24. The apparatus of claim 23, wherein the instructions are further executable by the processor to cause the apparatus to:
store data associated with the multicast downlink transmission in a buffer; and
label the stored data associated with the multicast downlink transmission with the second feedback process identifier.

25. The apparatus of claim 23, wherein the instructions are further executable by the processor to cause the apparatus to:

determine to refrain from storing data associated with the multicast downlink transmission in a buffer based at least in part on the second feedback process identifier.

26. The apparatus of claim 23, wherein the instructions are further executable by the processor to cause the apparatus to:
receive control signaling indicating a buffer storage configuration for storing data associated with the multicast downlink transmission in a buffer.

27. The apparatus of claim 23, wherein the instructions are further executable by the processor to cause the apparatus to:
determine that the first feedback process identifier and the second feedback process identifier correspond to a same feedback process identifier value and that the first radio network temporary identifier is different from the second radio network temporary identifier; and
flush stored data from a buffer based at least in part on determining that the first feedback process identifier and the second feedback process identifier correspond to the same identifier value and that the first radio network temporary identifier is different from the second radio network temporary identifier.

28. The apparatus of claim 23, wherein the instructions are further executable by the processor to cause the apparatus to:
apply one or more feedback process processing rules to the unicast downlink transmission and the multicast downlink transmission according to a single hybrid automatic repeat request process for the unicast downlink transmission and the multicast downlink transmission.

29. The apparatus of claim 23, wherein the instructions are further executable by the processor to cause the apparatus to:
identify a first data rate for the multicast downlink transmission and a second data rate for the unicast downlink transmission, wherein the first data rate and the second data rate are dynamically configured based at least in part on the component carrier data rate.

30. The apparatus of claim 22, wherein the instructions are further executable by the processor to cause the apparatus to:
receive configuration signaling indicating a semi-static assignment of a first plurality of feedback process identifiers for unicast downlink transmissions and a second plurality of feedback process identifiers for multicast downlink transmissions.

31. The apparatus of claim 30, wherein the instructions are further executable by the processor to cause the apparatus to:
manage a first hybrid automatic repeat request process for the unicast downlink transmission; and
manage a second hybrid automatic repeat request process for the multicast downlink transmission, wherein the second hybrid automatic repeat request process is managed in parallel with the first hybrid automatic repeat request process.

32. The apparatus of claim 31, wherein the instructions are further executable by the processor to cause the apparatus to:
apply one or more feedback process processing rules to both the unicast downlink transmission and the multicast downlink transmission across the first hybrid automatic repeat request process and the second hybrid automatic repeat request process.

33. The apparatus of claim 31, wherein the instructions are further executable by the processor to cause the apparatus to:
identify a non-sequential ordering between a downlink data transmission and a corresponding feedback process identifier across the first hybrid automatic repeat request process and the second hybrid automatic repeat request process or a non-sequential ordering between a control channel transmission and a corresponding data transmission across the first hybrid automatic repeat request process and the second hybrid automatic repeat request process.

34. The apparatus of claim 23, wherein the instructions are further executable by the processor to cause the apparatus to:
receive configuration signaling that configures a first set of physical downlink control channel candidates for the first control signaling indicating the first radio network temporary identifier and configures a second set of physical downlink control channel candidates for the second control signaling indicating the second radio network temporary identifier.

35. The apparatus of claim 23, wherein the instructions are further executable by the processor to cause the apparatus to:
receive configuration signaling that indicates a first feedback processing timeline for the unicast downlink transmission and a second feedback processing timeline for the multicast downlink transmission, wherein the first feedback processing timeline is different from the second feedback processing timeline.

36. The apparatus of claim 31, wherein the instructions are further executable by the processor to cause the apparatus to:
identify a first data rate for the multicast downlink transmission and a second data rate for the unicast downlink transmission, wherein the first data rate and the second data rate are semi-statically configured based at least in part on the component carrier data rate.

37. The apparatus of claim 31, wherein the instructions are further executable by the processor to cause the apparatus to:
determine that the first feedback process identifier and the second feedback process identifier correspond to a same feedback process identifier value and that the first radio network temporary identifier is different from the second radio network temporary identifier;
store data associated with the unicast downlink transmission in a first buffer according to the first hybrid automatic repeat request process; and
store data associated with the multicast downlink transmission in a second buffer according to the second hybrid automatic repeat request process.

38. The apparatus of claim 30, wherein the instructions are further executable by the processor to cause the apparatus to:
identify the first feedback process identifier from the first plurality of feedback process identifiers; and
identify the second feedback process identifier from the second plurality of feedback process identifiers.

39. An apparatus for wireless communications at a user equipment (UE), comprising:
a processor,
memory coupled with the processor; and
instructions stored in the memory and executable by the processor to cause the apparatus to:

receive broadcast signaling having a periodicity above a first threshold, a transport block size below a second threshold, or both;

receive a multicast downlink transmission that is configured without feedback processing and a unicast downlink transmission, wherein a combined data rate for the unicast downlink transmission and the multicast downlink transmission is less than a component carrier data rate; and process the multicast downlink transmission and the broadcast signaling during a same time period based at least in part on a remainder of a baseband processing budget for broadcast signaling processing.

40. The apparatus of claim 39, wherein the instructions are further executable by the processor to cause the apparatus to:

process the unicast downlink transmission, the multicast downlink transmission, and the broadcast signaling during the same time period based at least in part on the remainder of the baseband processing budget for broadcast signaling processing.

41. The apparatus of claim 39, wherein the instructions are further executable by the processor to cause the apparatus to:

receive configuration signaling indicating a processing allocation of the baseband processing budget among broadcast signaling processing, unicast signaling processing, and multicast signaling processing.

42. The apparatus of claim 39, wherein the multicast downlink transmission is received and processed while the UE is in an idle state or an inactive state.

\* \* \* \* \*